(12) United States Patent
Yone

(10) Patent No.: US 7,597,019 B2
(45) Date of Patent: *Oct. 6, 2009

(54) TRANSMISSION OPERATING APPARATUS FOR VEHICLE

(75) Inventor: Shinichi Yone, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 11/502,422

(22) Filed: Aug. 11, 2006

(65) Prior Publication Data

US 2007/0017312 A1 Jan. 25, 2007

Related U.S. Application Data

(63) Continuation-in-part of application No. 10/369,529, filed on Feb. 21, 2003, now Pat. No. 7,107,868.

(30) Foreign Application Priority Data

Mar. 12, 2002 (JP) ............... 2002-066374

(51) Int. Cl.
*F16H 59/00* (2006.01)
*F16H 61/00* (2006.01)
*F16H 63/00* (2006.01)

(52) U.S. Cl. ............... 74/336 R; 74/335; 74/473.12; 74/473.18; 74/473.3

(58) Field of Classification Search ............... None
See application file for complete search history.

(56) References Cited

U.S. PATENT DOCUMENTS 5,009,128 A 4/1991 Seidel et al.
5,357,820 A 10/1994 Moroto et al.
5,489,247 A 2/1996 Markyvech et al.
5,527,234 A * 6/1996 Kroeger ............... 477/80
5,946,976 A 9/1999 Miyoshi et al.
6,422,106 B1 7/2002 Lee
6,474,186 B1 11/2002 Vollmar
6,622,583 B2 9/2003 Wang
7,001,308 B2 * 2/2006 Henneken et al. ........... 477/121
7,104,152 B2 * 9/2006 Levin et al. ............. 74/471 XY
7,107,868 B2 * 9/2006 Yone ............... 74/335
2002/0021282 A1 2/2002 Masudaya
2003/0188594 A1 10/2003 Levin et al.
2004/0016314 A1 1/2004 Satoh et al.

FOREIGN PATENT DOCUMENTS

| JP | H. 08-58437 | 4/1994 |
| JP | H. 08-132903 | 11/1994 |
| JP | 2002-62944 A | 8/2000 |
| JP | 2001-105926 | 4/2001 |
| WO | 01/31232 A1 | 5/2001 |

* cited by examiner

*Primary Examiner*—David D. Le
(74) *Attorney, Agent, or Firm*—Arent Fox LLP

(57) ABSTRACT

A transmission operating apparatus for a vehicle includes a shift lever manipulable by a driver, and at least one counterforce applying unit which electrically applies a counterforce counteracting a shifting operation of the shift lever to the shift lever corresponding to a respective position of the shift lever. The counterforce to be applied to the shift lever by the counterforce applying unit is changed when predetermined conditions are satisfied.

14 Claims, 11 Drawing Sheets

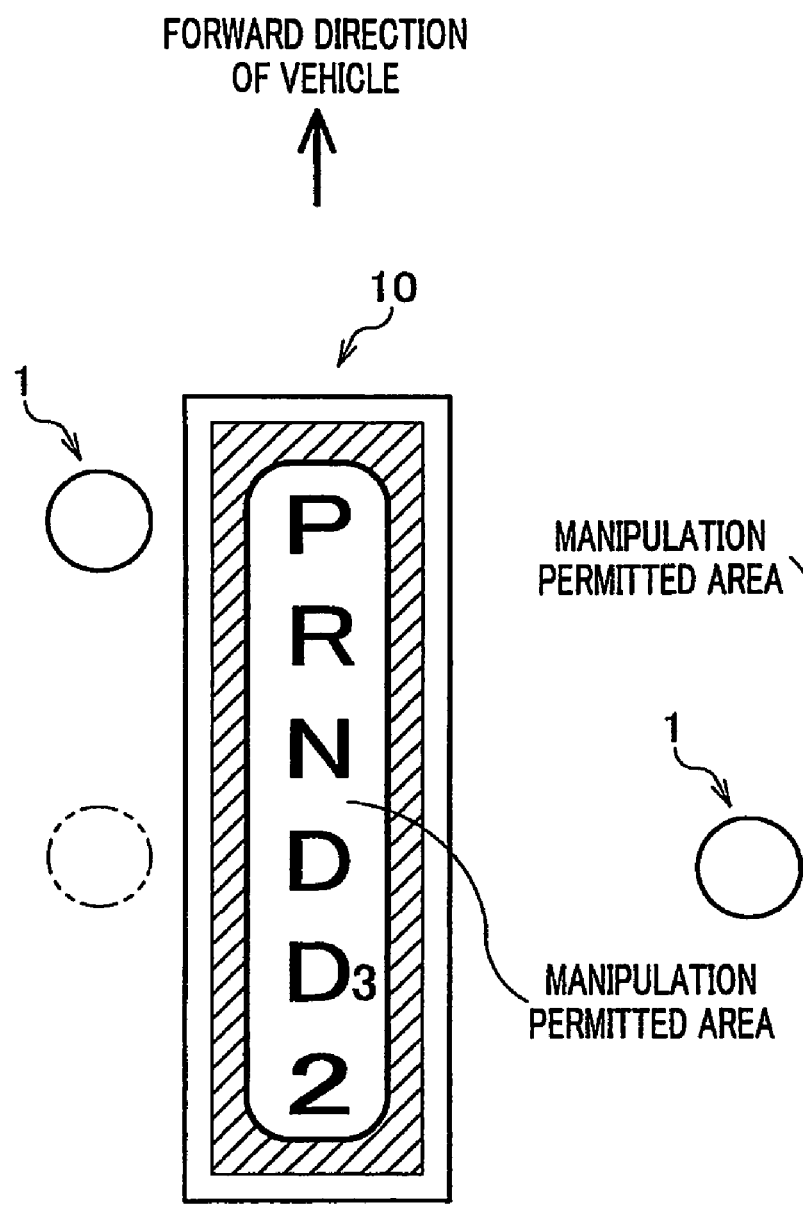
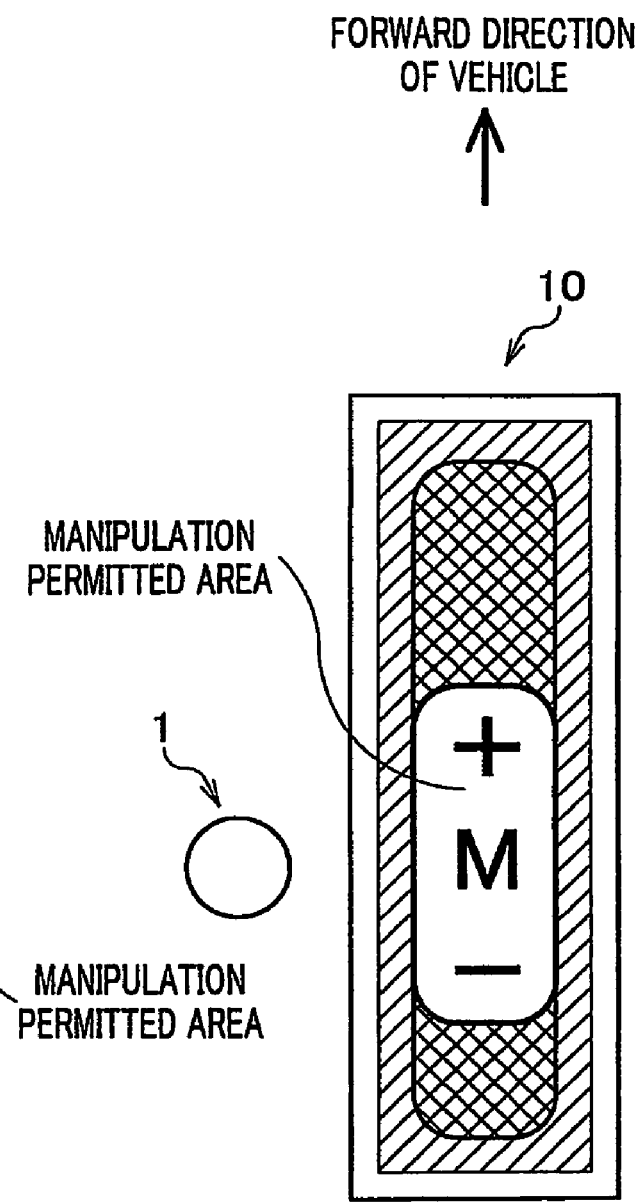

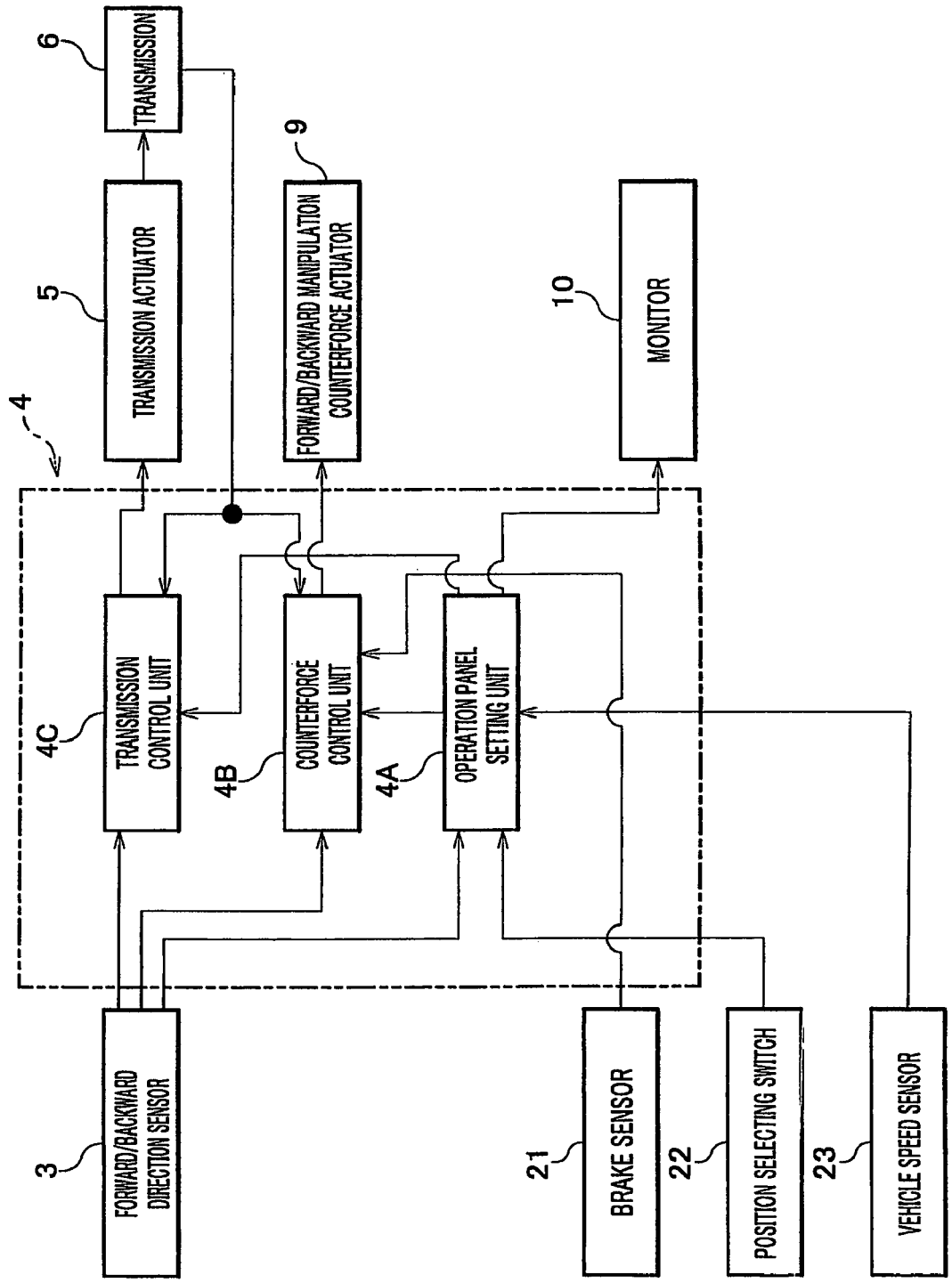

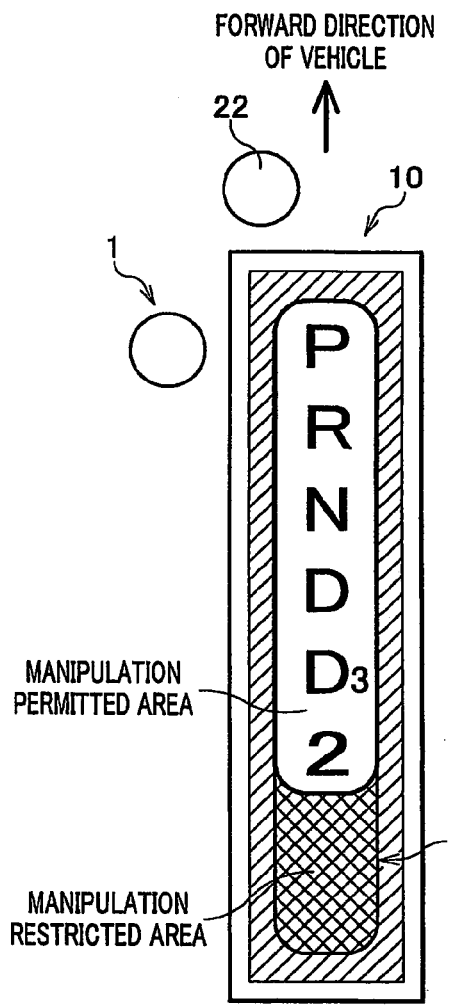
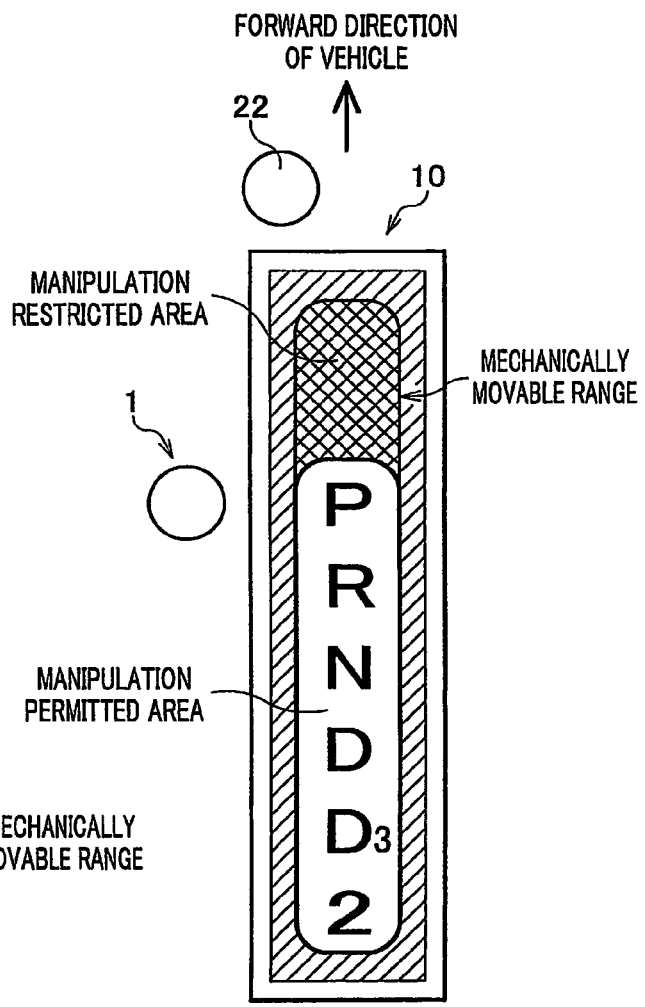
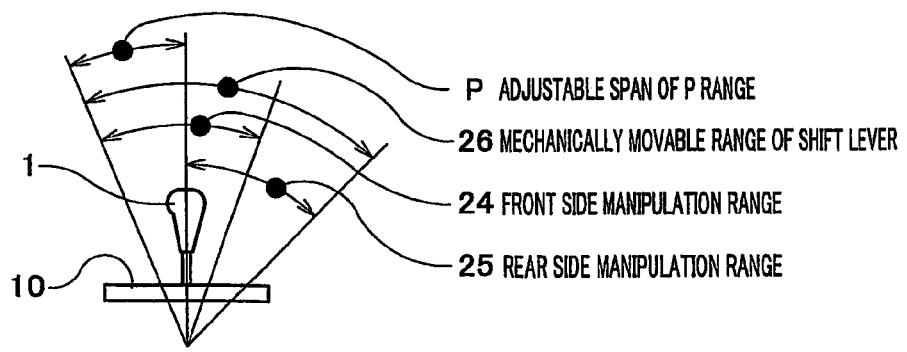

TRANSMISSION OPERATING APPARATUS FOR VEHICLE

CROSS REFERENCE TO RELATED APPLICATIONS

This application is a continuation-in-part of U.S. patent application Ser. No. 10/369,529 filed on Feb. 21, 2003, now U.S. Pat. No. 7,107,868 claiming priority of Japanese Patent Application No. 2002-066374 filed on Mar. 12, 2002, both of which are incorporated herein by reference in their entirety.

FIELD OF THE INVENTION

The present invention relates to a transmission operating apparatus for a vehicle.

BACKGROUND OF THE INVENTION

In a conventional transmission operating apparatus including a shift lever, a counterforce is mechanically applied to the shift lever using detent and the like. In this instance, it is impossible to change the counterforce applied to the shift lever in accordance with driving states of the vehicle or manipulation states of the driver.

Also, in recent years, transmission operating apparatus have been proposed, which enables to select both an automatic transmission operation mode wherein a gear change is automatically carried out with a shift lever positioned in a drive (D) position and a manual transmission operation mode wherein gear-shifting is manually carried out from the first gear, the second gear and the like. In these transmission operating apparatuses, during the automatic transmission operation mode, the transmission is generally controlled by a connection mechanism that is mechanically connected from the proximity of the supporting point of the movable shift lever to the transmission, whereas during the manual transmission operation mode, an electric signal is transmitted to the control means whenever the shift lever contacts with switches arranged at the front and rear sides of the shift lever, and the transmission is controlled by the control means.

However, these conventional transmission operation apparatus have a construction in that a guide groove (shift gate) for setting the shift pattern is mechanically or structurally produced and the driver can not change the shift pattern of the completed vehicle. It is also difficult to adjust the position of the shift lever in accordance with the driver's body size.

In view of the drawbacks of the prior art, the present invention seeks to provide a transmission operating apparatus for a vehicle, which enables to change the counterforce applied to the shift lever when predetermined conditions are satisfied.

SUMMARY OF THE INVENTION

According to a first aspect of the invention, there is provided a transmission operating apparatus for a vehicle including: a shift lever manipulable by a driver; and at least one counterforce applying unit which electrically applies a counterforce counteracting a shifting operation of the shift lever to the shift lever corresponding to a position of the shift lever, wherein the counterforce to be applied to the shift lever by the counterforce applying unit is changed when predetermined conditions are satisfied.

With this construction of the aforementioned transmission operating apparatus, the counterforce to be applied to the shift lever can be changed by the counterforce applying unit in accordance with various conditions.

The transmission operating apparatus constructed as discussed above may further comprise at least one position detector which detects the respective position of the shift lever, and a transmission control unit which controls a transmission based on the position of the shift lever.

The transmission operating apparatus constructed as discussed above may further comprise a manually manipulable operation mode selecting switch which selects one of a plurality of operation modes, and an operation area adjusting unit for different admissible operation areas assigned to the operation modes in each of which the shift lever is movable, which, depending on the selected operation mode, fixes the respective admissible operation area by means of the counterforce applying unit.

The plurality of operation modes may comprise: an automatic transmission operation mode in which a plurality of automatic transmission positions are arranged in line along a forward and backward direction and one of the automatic transmission positions can be selected by the shift lever; and a manual transmission operation mode in which shift stages are switchable by moving the shift lever along a forward and backward direction.

With this construction of the aforementioned transmission operating apparatus, if the operation mode selecting switch is set, for example, in the automatic transmission operation mode and the driver shifts the shift lever in a desired direction, a counterforce corresponding to the position of the shift lever is applied to the driver through the shift lever by means of the counterforce applying unit. When the shift lever has been shifted to a desired position, the position detector detects the position of the shift lever, and based on a signal from the position detector, the transmission control unit controls the transmission.

Meanwhile, for example, in the manual transmission operation mode, the manual transmission operation mode selected by the operation mode selecting switch is set and according to the position of the shift lever, an appropriate counterforce force is applied to the shift lever and the transmission is properly controlled.

The transmission operating apparatus constructed as discussed above may further comprise a position selecting switch which selects one of a plurality of admissible operation areas in each of which the shift lever is movable, and an operation area adjusting unit which fixes, within a range in which the shift lever is mechanically movable, the respective admissible operation areas to be selected by the position selecting switch by means of the counterforce applying unit.

With this construction of the aforementioned transmission operating apparatus, in a case in which the automatic transmission positions are arranged in line along the forward and backward direction, such as in the order of a P (parking), an R (reverse), an N (neutral) and a D (drive) from forward, if the whole automatic transmission positions should be shifted, the driver moves the shift lever to the P position when the vehicle is stopped. When the driver selects a desired position with the use of the position selecting switch, the shift lever moves continuously and variably to the selected position. The automatic transmission positions also change the position in accordance with the shift lever, so that the shift lever is positioned in the P position. The position detector then detects the position of the shift lever and transmits a signal to the counterforce applying unit. Based on this signal from the position detector, the counterforce applying unit restricts the movement of the shift lever in the backward direction away from the D position as well as in the forward direction away from the P position, so that the whole automatic transmission positions from the P position to the D position can be adjusted.

The counterforce applying unit carries out the adjustment of the whole automatic transmission positions within the mechanically movable range of the shift lever. Therefore, on the driver's demand, the shift lever can be adjustable in the forward and backward direction without a dedicated mechanism.

In the aforementioned transmission operating apparatus, the operation mode selecting switch may be configured such that applying a force to the shift lever in a sideward direction causes the selection between the automatic transmission operation mode and the manual transmission operation mode.

With this construction of the aforementioned transmission operating apparatus, the automatic transmission operation mode and the manual transmission operation mode are properly switched when the driver applies a load to the shift lever in the sideward direction.

Further, in the aforementioned transmission operating apparatus, the plurality of operation modes may comprise: an automatic transmission operation mode in which a plurality of automatic transmission positions are arranged having the form of an "I" or in a zigzag manner and one of the automatic transmission positions is selectable by the shift lever; and a manual transmission operation mode in which a plurality of shift transmission positions are arranged in the form of an "H" and one of the shift transmission positions is selectable by the shift lever.

With this construction of the aforementioned transmission operating apparatus, the automatic transmission operation mode is configured as the "I type" or the "zigzag type" arrangement where the shift lever is operated in forward and backward directions, whereas the manual transmission operation mode is configured as the "H type" arrangement where the shift lever is operated in right and left directions as well as in forward and backward directions. Therefore, the driver can recognize the automatic transmission operation mode and the manual transmission operation mode without confusion.

The transmission operating apparatus constructed as discussed above may further comprise a display member for visually displaying the admissible operation area adjusted by the operation area adjusting unit.

With this construction of the aforementioned transmission operating apparatus, the admissible operation area assigned to the corresponding operation mode selected by the operation mode selecting switch is visually indicated, for example, as an image by the display member.

Therefore, like the conventional transmission operating apparatus, the driver can visually recognize the position of the shift lever.

Further, in the aforementioned transmission operating apparatus, the counterforce applying unit may apply a higher force to the shift lever when the shift lever is moved to a position that is two or more transmission positions away from a current transmission position in order to prevent a driver's unintentional shift lever manipulation.

With this construction of the aforementioned transmission operating apparatus, in the case in which the automatic transmission positions such as a P (parking), an R (reverse), an N (neutral) and a D (drive) are arranged in line in the forward and backward direction, when the shift lever is positioned in the "D" position, the position detector detects the position of the shift lever and transmits a signal to the counterforce applying unit. The counterforce applying unit then determines the driver's intention based on information from the vehicle speed detector, the engine rotational speed detector, the accelerator opening degree detector, the braking operation detector and the like. In order to prevent the driver's unintentional shift lever manipulation, when the vehicle speed is greater than a predetermined speed with the shift lever positioned in the D position, the counterforce applying unit applies an increased operation load to the R position that is two positions away from the D position. Meanwhile, when the vehicle speed is not greater than the predetermined speed, the counterforce applying unit does not increase the operation load.

Therefore, it is not necessary to provide a dedicated lock mechanism to prevent overshifting, which leads to reduction of the cost.

Further, in the aforementioned transmission operating apparatus, the counterforce applying unit may control the counterforce such that the shift lever gradually returns to an original position when a manual shift operation force applied to the shift lever decreases.

With this construction of the transmission operating apparatus, in the case in which the vehicle is stopped and the shift lever is positioned in the P position, the counterforce applying unit increases the operation load toward the R position that is positioned backward of the P position so as to prevent the shift lever from being shifted to the R position. In this instance, even if the driver manipulates the shift lever against the increased operation load, the transmission control unit keeps on transmitting a signal that is based on the previous position, i.e. the P position, to the transmission. When the driver releases the load from the shift lever, the counterforce applying unit gradually decreases the counterforce that has been applied to the shift lever, so that the shift lever is gradually returned to the original position. And if the driver depresses the brake pedal, the signal is transmitted to the counterforce applying unit, so that the increased operation load toward the R position is recovered to the normal detent load.

In other words, when the vehicle is stopped and the shift lever is positioned in the P position, the counterforce applying unit locks up the shift lever, for example, until the driver depresses the brake pedal. Therefore, the shift lock can be performed without a dedicated mechanism.

In the aforementioned transmission operating apparatus, when the manual transmission operation mode is selected by the operation mode selecting switch and the shift stage is set in an uppermost gear or a lowermost gear, the counterforce applying unit may control the counterforce such that the shift lever is blocked against a respective further manual operation in the upshift or downshift direction.

To be more specific, in the manual transmission operation mode, the counterforce applying unit may apply a predetermined counterforce by which the shift lever is gradually returned to a base position when the shift lever is moved from the base position in the forward or backward direction. Further, the counterforce applying unit may apply a counterforce that is greater than the predetermined counterforce to the shift lever when the shift lever is further shifted to the upshift or downshift direction from the uppermost gear or the lowermost gear.

With this construction of the transmission operating apparatus, for example, when the driver forwardly tilts and shifts up the shift lever in order from the first speed gear to the top gear, the shift lever has been moved in the uppermost gear position and a manipulation of the shift lever further in the upshift direction does not achieve a shift-change. In this instance, the counterforce applying unit increases the operation load in relation to the upshift operation of the shift lever so as to restrict the forward shift movement of the shift lever.

This enables the driver to recognize that the shift lever has been shifted to the uppermost gear range. Therefore, it is possible to adjust the operation feel of the sequential mode to the actual vehicle, such that an upshift is performed when the shift lever is tilted forward and a downshift is performed when the shift lever is tilted backward.

In the aforementioned transmission operating apparatus, when the shift stage is set in an uppermost gear or a lowermost gear, the counterforce applying unit may increase the counterforce such that the shift lever is blocked against a respective further manual operation in the upshift or downshift direction. Also, when the vehicle runs at a predetermined vehicle speed or a higher vehicle speed, the counterforce applying unit may increase the counterforce such that the shift lever is blocked against a manual operation to an R position.

With this construction of the transmission operating apparatus, it is possible to warn the driver of a wrong operation.

BRIEF DESCRIPTION OF THE DRAWINGS

Preferred embodiments of the present invention will be described below, by way of example only, with reference to the accompanying drawings, in which:

FIG. 2A is a plan view illustrating an automatic transmission pattern displayed on a monitor shown in FIG. 1, and FIG. 2B is a plan view illustrating a manual transmission pattern displayed on the monitor;

FIG. 5 is a block diagram illustrating the structure of a transmission operating apparatus according to a second embodiment of the invention;

FIG. 6A is a plan view illustrating an automatic transmission pattern displayed on a front side of the monitor according to the second embodiment, and FIG. 6B is a plan view illustrating the automatic transmission pattern displayed on a rear side of the monitor;

FIG. 7 is a schematic side view illustrating a manipulation range of a shift lever according to the second embodiment;

DESCRIPTION OF THE PREFERRED EMBODIMENTS

Figure 1:
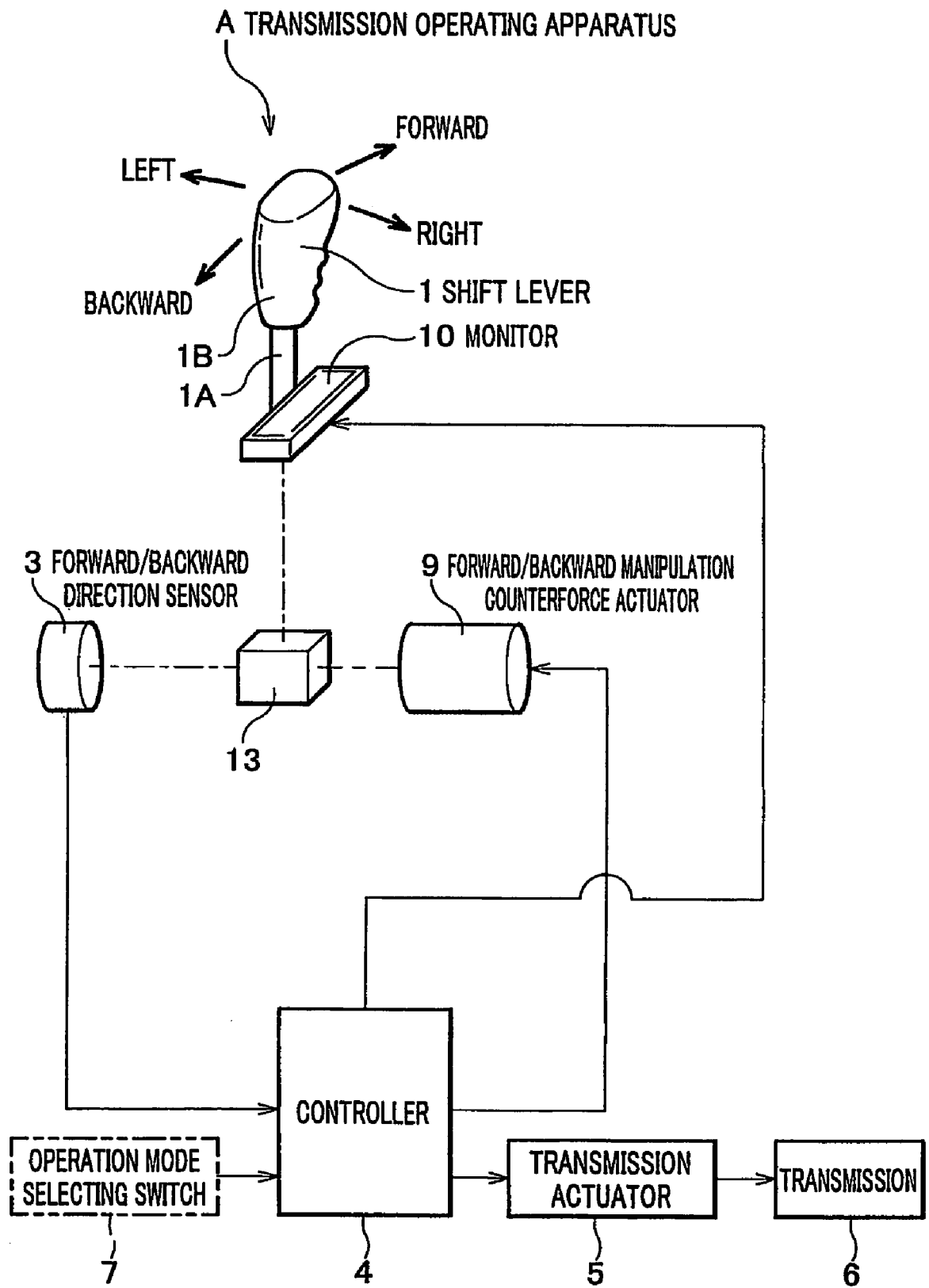
FIG. 1 shows the whole arrangement of a transmission operating apparatus according to a first embodiment of the invention.

With reference to the accompanied drawings, preferred embodiments of a transmission operating apparatus according to the invention will be described. In the drawings to be referred herein, FIG. 1 shows the whole arrangement of the transmission operating apparatus according to a first embodiment of the invention. In the first embodiment and the second embodiment to be described later, a monitor is fixed, whereas in the third embodiment to be described later, a monitor is movable together with a shift lever.

First Embodiment

As shown in FIG. 1, a transmission operating apparatus A includes a shift lever 1, a forward/backward direction sensor 3, a controller 4, an operation mode selecting switch 7, a forward/backward manipulation counterforce actuator 9, and a monitor 10. The controller 4 of the transmission operating apparatus A controls a transmission 6 by way of actuating a transmission actuator 5 based on a control signal, thereby providing shift by wire. For this reason, the shift lever 1 and the transmission 6 are not mechanically connected and are separated to each other.

Herein, the forward/backward direction sensor 3 corresponds to the "position detector" defined in the claims. The monitor 10 corresponds to the "display member" defined in the claims.

Shift Lever

The construction of the shift lever 1 will be described.

The shift lever 1 is arranged at the proximity of the driver seat to enable the driver to manipulate it. The shift lever 1 includes a stick body 1A in the form of a pipe and a manipulation grip 1B fixed to the top end of the stick body 1A, and the lower end (base portion) of the stick body 1A is supported by a support mechanism 13 to enable a tiltable movement of the shift lever 1 in forward and backward directions. The tilting operation of the shift lever 1 in the forward and backward directions is detected by the forward/backward direction sensor 3, such as a potentiometer provided at a rotation shaft that enables the manipulation of the shift lever 1 in the forward and backward directions, so that the manipulation amount is detected (outputted) as an electric signal. The forward/backward direction sensor 3 transmits the detected value to the controller 4.

The support mechanism 13 has a forward/backward manipulation counterforce actuator 9 which applies a counterforce to the movement of the shift lever 1 in relation to the driver's manipulation of the shift lever 1 in the forward and backward directions. Direction and magnitude of the counterforce is set by the controller 4, as will be described later.

Operation Mode Selecting Switch

The operation mode selecting switch 7 selects one operation mode to be manipulated by the shift lever 1 from an automatic transmission operation mode and a manual transmission operation mode. The operation mode selecting switch 7 is provided, for example, at the monitor 10, and when the driver operates the operation mode selecting switch 7 under certain conditions, the automatic transmission operation mode and the manual transmission operation mode can be switched alternately. When the operation mode selecting switch 7 selects one of the automatic transmission operation mode and the manual transmission operation mode, a signal indicating the selected operation mode is transmitted to the controller 4. The controller 4 then sets an operation panel corresponding to the operation mode selected by the operation mode selecting switch 7, and transmits (displays) the signal to the monitor 10.

Monitor

The monitor 10 is provided at the proximity of the base portion of the shift lever 1 as a thin-type liquid crystal monitor substantially in the form of a rectangular parallelepiped extending in the longitudinal direction of the vehicle, and the operation panel set by the controller 4 is visualized as an image. The operation panel visualized by the monitor 10 will be described below. The operation panels displayed on the monitor 10 include an automatic transmission pattern as shown in FIG. 2A wherein a plurality of automatic transmission positions, such as a P (parking), an R (reverse), an N (neutral), a D (drive), a D3 (third speed gear), and a 2 (second speed gear) are arranged in line along the forward and backward direction in turn from the forward, and a manual transmission pattern as shown in FIG. 2B wherein the upshift is achieved when the shift lever 1 is tilted forward around an M position (base position) and the downshift is achieved when the shift lever 1 is tilted backward around the M position.

Controller

Figure 3:
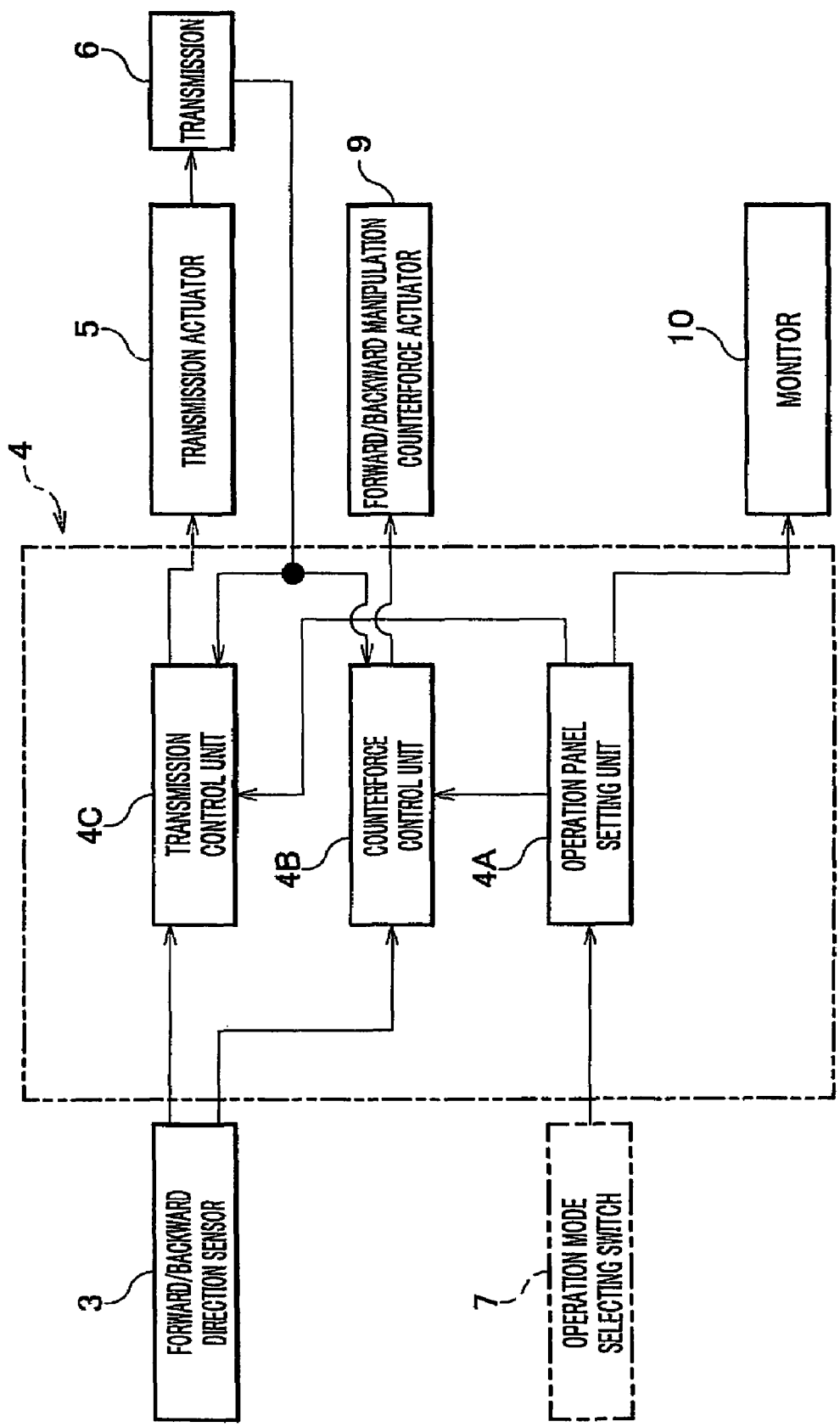
FIG. 3 is a block diagram illustrating the structure of the transmission operating apparatus shown in FIG. 1.

The controller 4 is constructed by a computer, a drive circuit, and the like. When the output signal from the forward/backward direction sensor 3 is digitalized and inputted to the controller 4, the controller 4 carries out a certain process and outputs a drive signal to drive a transmission actuator 5, the forward/backward manipulation counterforce actuator 9 and the monitor 10 under a predetermined control. As shown in FIG. 3, the controller 4 includes an operation panel setting unit 4A, a counterforce control unit 4B, and a transmission control unit 4C.

Herein, the operation panel setting unit 4A corresponds to the "operation area adjusting unit" defined in the claim. The counterforce control unit 4B and the forward/backward manipulation counterforce actuator 9 correspond to the "counterforce applying unit" defined in the claims. Further, the transmission control unit 4C corresponds to the "transmission control unit" defined in the claims.

Operation Panel Setting Unit

The operation panel setting unit 4A sets the operation panel corresponding to the operation mode selected by the operation mode selecting switch 7, and outputs the signal to the counterforce control unit 4B, the transmission control unit 4C, and the monitor 10. The operation panel selected by the operation mode selecting switch 7 is set by the operation panel setting unit 4A of the controller 4 and is displayed on the monitor 10. In the operation panel setting unit 4A, the automatic transmission pattern is set as an initial value so that the automatic transmission pattern is displayed on the monitor 10 when the engine of the vehicle is actuated.

Counterforce Control Unit

The counterforce control unit 4B sets a counterforce corresponding to the position of the shift lever 1 in accordance with the operation panel set by the operation panel setting unit 4A, and applies the counterforce to the shift lever 1 through the forward/backward manipulation counterforce actuator 9. Specifically, in the case in which the operation panel is the automatic transmission pattern as shown in FIG. 2A, when the driver shifts the shift lever 1 between the respective positions, such as from the P position to the R position, from the R position to the N position, and the like, a predetermined detent load is applied to the shift lever 1 (i.e. a small counterforce is applied to the operational direction before the manipulation of the shift lever 1, and then a force which leads the shift lever 1 to the next position is applied), thereby providing a feel similar to the conventional mechanical shift manipulation. If the shift lever 1 is positioned in the range of the R position to the D3 position, the forward/backward manipulation counterforce actuator 9 retains the position of the shift lever 1. If the shift lever 1 is positioned in the P position or the 2 position, the forward/backward manipulation counterforce actuator 9 may retain the position of the shift lever 1. Alternatively, the position of the shift lever 1 may be retained with the shift lever 1 supported at the front end or the rear end of the shift gate (not shown) which is provided at the support mechanism 13. Further, at the front end of the shift gate of the support mechanism 13 is provided a mechanism to lock the shift lever 1 when the engine stops.

In the case of the manual transmission pattern, when the shift lever 1 is shifted in the forward and backward directions from the M position as the base position, a predetermined counterforce is set by the counterforce control unit 4B, and the signal indicating the counterforce is outputted to the forward/backward manipulation counterforce actuator 9. The counterforce control unit 4B outputs a signal to the forward/backward manipulation counterforce actuator 9 such that the shift lever 1 gradually returns to the position of the M position when the driver releases the shift lever 1.

Further, according to the respective operation panels corresponding to the operation mode selected by the operation mode selecting switch 7 and set by the operation panel setting unit 4A, the counterforce control unit 4B of the controller 4 controls the forward/backward manipulation counterforce actuator 9 to electrically apply a counterforce such that different admissible operation areas assigned to the operation modes are fixed. As shown in FIG. 2, the shift lever 1 is movable within the admissible operation area assigned and set by the operation panel setting unit 4A and fixed by the counterforce control unit 4B and the forward/backward manipulation counterforce actuator 9.

Transmission Control Unit

The transmission control unit 4C controls the transmission actuator 5 which switches gears of the transmission 6 based on the position of the shift lever 1 in relation to the operation panel set by the operation panel setting unit 4A. To be more specific, in the case in which the operation panel set by the operation panel setting unit 4A is the automatic transmission pattern (see FIG. 2A), when the shift lever 1 is set in the R position, the forward/backward direction sensor 3 detects the manipulation amount (displacement amount) of the shift lever 1 on the basis of the P position and transmits the same to the transmission control unit 4C. Based on the signal indicating the automatic transmission pattern and transmitted from the operation panel setting unit 4A and the signal transmitted from the forward/backward direction sensor 3, the transmission control unit 4C recognizes that the shift lever 1 is positioned in the R position and transmits such a signal to the transmission actuator 5. And the transmission 6 is switched to the reverse gear when the transmission actuator 5 is actuated. Also, in other positions such as the P position or one of the positions from the N position to the 2 position, the transmission control unit 4C properly controls the transmission actuator 5 based on the signals from the forward/backward direction sensor 3 and the operation panel setting unit 4A.

In the case in which the operation panel is the manual transmission pattern (see FIG. 2B), when the shift lever 1 is tilted to a predetermined position that is forwardly away from the position of the M position, the forward/backward direction sensor 3 detects the manipulation amount of the shift lever 1 in the forward direction from the M position, and transmits the same to the transmission control unit 4C. Based on the signal indicating the manual transmission pattern and transmitted from the operation panel setting unit 4A and the signal transmitted from the forward/backward direction sensor 3, the transmission control unit 4C transmits a signal to the transmission actuator 5 such that the transmission 6 is switched to an upper gear that is one stage higher than the current gear position. On the contrary, when the shift lever 1 is tilted to a predetermined position that is backwardly away from the position of the M position, the transmission control unit 4C transmits a signal to the transmission actuator 5 such that the transmission 6 is switched to a lower gear that is one stage lower than the current gear position. If the shift lever has been moved in the upshift end position or the downshift end position and the manipulation of the shift lever 1 in the upshift direction or the downshift direction does not achieve a change of the shift stage, in other words, when the shift stage is set in the uppermost gear or the lowermost gear and the shift lever 1 is shifted in the forward direction or the backward direction, a non-illustrated sensor provided at the transmission 6 transmits a signal indicating that the uppermost gear or the lowermost gear is selected to the counterforce control unit 4B and the transmission control unit 4C. Based on this signal, the counterforce control unit 4B transmits a signal to the forward/backward manipulation counterforce actuator 9 such that an increased operation load is applied to the direction where the change of the shift stage is not achieved, and the signal transmitted from the transmission control unit 4C to the transmission actuator 5 is shut off. Therefore, the shift lever 1 is blocked against a respective further manual operation in the upshift or downshift direction from the uppermost gear or the lowermost gear.

With reference to FIGS. 2A and 2B, operation of the transmission operating apparatus A will be described.

When starting the engine of the vehicle, the automatic transmission pattern as shown in FIG. 2A is displayed on the monitor 10, and the shift lever 1 arranged at the front left side of the monitor 10 is positioned in the P position of the automatic transmission pattern. And the position of the shift lever 1 is detected by the forward/backward direction sensor 3, and the signal indicating the position of the shift lever 1 is transmitted to the transmission control unit 4C and the counterforce control unit 4B provided in the controller 4 (see FIGS. 1 and 3). The transmission control unit 4C transmits a signal indicating the P position to the transmission actuator 5 based on the signal from the forward/backward direction sensor 3 and the signal from the operation panel setting unit 4A. The counterforce control unit 4B sets a detent load between the respective positions in accordance with the position of the shift lever 1 that is in the P position, and transmits the signal concerning the detent load to the forward/backward manipulation counterforce actuator 9. At the same time, according to the automatic transmission pattern set by the operation panel setting unit 4A, the counterforce control unit 4B controls the forward/backward manipulation counterforce actuator 9 to electrically apply a counterforce such that the admissible operation area assigned to the automatic transmission operation mode is fixed.

When the shift lever 1 is positioned in other positions, the transmission control unit 4C transmits a signal corresponding to the position of the shift lever 1 to the transmission actuator 5, and the counterforce control unit 4B sets the detent load between the respective positions.

Figure 4:
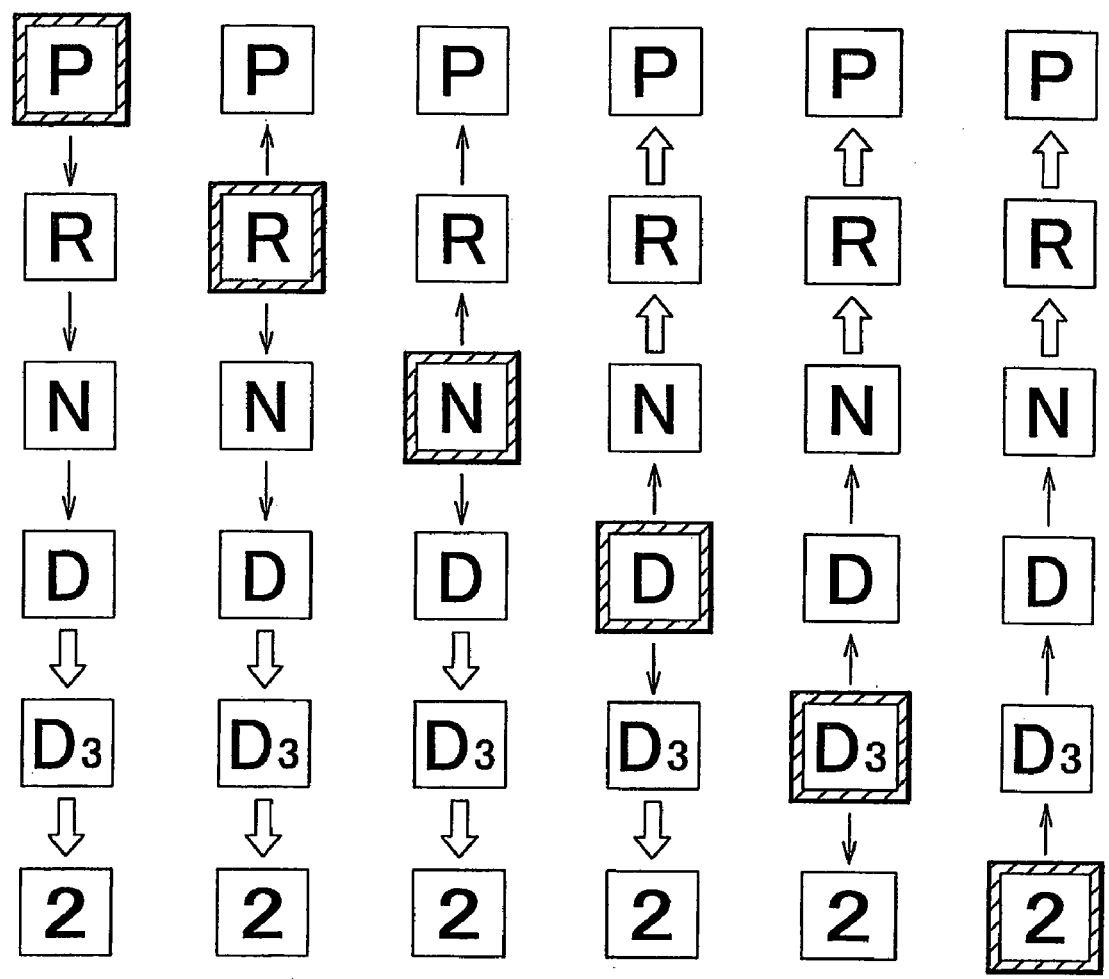
FIG. 4 is a plan view illustrating detent loads applied between respective positions of the automatic transmission pattern as shown in FIG. 2A when a shift lever is positioned in the respective positions.

As shown in FIG. 4, the detent load between the respective positions that is set by the counterforce control unit 4B is differentiated in accordance with the position of the shift lever 1 and other information such as the vehicle speed and the like. In FIG. 4, the hatching part surrounded by diagonal lines indicates the position of the shift lever 1, and among the arrows shown between the respective positions, the arrows illustrated by the thin line indicate a normal detent load, whereas the arrows illustrated by the void line indicate a detent load that is greater than the normal detent load. Further, FIG. 4 shows the detent loads between the respective positions wherein the shift lever 1 shifted in the order from the P position at the left end row to the 2 position at the right end row. Description will be given below in the order from the left end row.

As shown in FIG. 4, when the shift lever 1 is positioned in the P position, the counterforce control unit 4B, which sets the detent load (operation load) in accordance with the position of the shift lever 1, increases the operation load against the D3 position and the 2 position that are four or more positions away from the P position such that the increased operation load becomes greater than the normal operation load applied to the R position, the N position, and the D position. When the shift lever 1 is positioned in the R position, the counterforce control unit 4B increases the operation load against the D3 position and the 2 position that are three or more positions away from the R position such that the increased operation load becomes greater than the normal operation load. When the shift lever 1 position in the N position, the counterforce control unit 4B increases the operation load against the D3 position and the 2 position that are two or more positions away from the N position such that the increased operation load becomes greater than the normal operation load.

When the shift lever 1 is positioned in the D position and the vehicle speed is equal to or greater than a predetermined speed, the counterforce control unit 4B increases the operation load against the P position, the R position, and the 2 position that are two or more positions away from the D position such that the increased operation load becomes greater than the normal operation load. When the shift lever 1 is positioned in the D3 position and the vehicle speed is equal to or greater than the predetermined speed, the counterforce control unit 4B increases the operation load against the P position and the R position that are three or more positions away from the D3 position such that the increased operation load becomes greater than the normal operation load. When the shift lever 1 is positioned in the 2 position and the vehicle speed is equal to or greater than the predetermined speed, the counterforce control unit 4B increases the operation load against the P position and the R position that are four or more positions away from the 2 position such that the increased operation load becomes greater than the normal operation load. The operation load may be increased to such an extent that the increased operation load warns the driver of a wrong operation. For this reason, it is possible to set the operation load such that the position set at the greater operation load can be selected if the driver intentionally applies a large load to the shift lever 1.

As shown in FIG. 2, in the case in which the shift lever 1 is positioned in the D position of the automatic transmission pattern, when the driver operates the operation mode selecting switch 7, the signal is transmitted to the operation panel setting unit 4A in the controller 4. In the operation panel setting unit 4A, the operation panel is switched from the automatic transmission pattern to the manual transmission pattern based on the signal from the operation mode selecting switch 7, and the signal indicating the manual transmission pattern is transmitted to the counterforce control unit 4B, the transmission control unit 4C, and the monitor 10. The thus selected manual transmission pattern is displayed on the monitor 10, and the shift lever 1 is positioned in the M position of the manual transmission pattern. At the same time, according to the manual transmission pattern set by the operation panel setting unit 4A, the counterforce control unit 4B controls the forward/backward manipulation counterforce actuator 9 to electrically apply a counterforce such that the admissible operation area assigned to the manual transmission operation mode is fixed.

When the driver tilts the shift lever 1 forward from the M position to the predetermined position against the predetermined counterforce set by the counterforce control unit 4B, the forward/backward direction sensor 3 detects the position of the shift lever 1, and transmits the signal indicating that the shift lever 1 has been positioned in the predetermined position to the transmission actuator 5 through the transmission control unit 4C. Based on the signal from the transmission control unit 4C, the transmission actuator 5 switches the transmission 6 to an upper gear that is one stage higher than the current gear position, so as to allow the vehicle to speed up. If the manipulation of the shift lever 1 in the upshift direction does not achieve a change of the shift stage to the upper gear, the counterforce control unit 4B and the forward/backward manipulation counterforce actuator 9 restrict the movement of the shift lever in the upshift direction.

Meanwhile, when the driver tilts the shift lever 1 backward from the M position to the predetermined position against the predetermined counterforce, the forward/backward direction sensor 3 detects the position of the shift lever 1, and transmits the signal indicating that the shift lever 1 has been positioned in the predetermined position to the transmission actuator 5 through the transmission control unit 4C. Based on the signal from the transmission control unit 4C, the transmission actuator 5 switches the transmission 6 to a lower gear that is one stage lower than the current gear position, so as to allow the vehicle to speed down. If the manipulation of the shift lever 1 in the downshift direction does not achieve a change of the shift stage to the lower gear, the counterforce control unit 4B and the forward/backward manipulation counterforce actuator 9 restrict the movement of the shift lever 1 in the downshift direction.

The transmission operating apparatus A according to the first embodiment of the invention provides the following advantages.

(1) The operation modes such as the automatic transmission operation mode and the manual transmission operation mode can be set for an operation panel, and the transmission 6 is controlled in accordance with the position of the shift lever 1 corresponding to the operation panel. Therefore, it is possible to change the shift pattern or the position of the shift lever 1, leading to improved operating property.

(2) Since the operation panel is displayed as an image on the monitor 10 provided at the proximity of the base portion of the shift lever 1, the driver can visually recognize the position of the shift lever 1 and the operation panel in a manner similar to the conventional transmission operating apparatus.

(3) Since the automatic transmission pattern and the manual transmission pattern that are arranged in the forward and backward direction are alternately displayed on the monitor 10, it is possible to reduce the required space in the right and left direction when compared with the conventional transmission operating apparatus with a mechanical sequential mode.

(4) When the shift lever 1 is positioned in the D position of the automatic transmission pattern, the operation load applied to the R position that is two positions away from the D position is increased. This can prevent the driver from unintentionally overshifting the shift lever 1. Therefore, it is not necessary to provide a dedicated lock mechanism to prevent overshifting, leading to reduction of the cost. In other words, overshifting can be prevented by changing the setting of the controller 4 (computer) without requiring an additional mechanical element, leading to reduction of the cost.

(5) When the manipulation of the shift lever 1 in the upshift direction or the downshift direction does not achieve a change of the shift stage, the counterforce control unit 4B and the forward/backward manipulation counterforce actuator 9 restrict the movement of the shift lever 1 in the forward and backward directions. This enables the driver to recognize that the shift lever 1 has been shifted to the uppermost gear range or the lowermost gear range. Therefore, it is possible to adjust the operation feel of the sequential mode to the actual vehicle, such that an upshift is performed when the shift lever 1 is tilted forward and a downshift is performed when the shift lever 1 is tilted backward.

Second Embodiment

A transmission operating apparatus according to the second embodiment of the invention will be described below. Since the transmission operating apparatus described in this embodiment is a modification of the first embodiment, like reference characters designate corresponding parts in the drawings and detailed description thereof will be omitted. In the drawings to be referred herein, FIG. 5 is a block diagram illustrating the structure of the transmission operating apparatus according to the second embodiment of the invention, FIG. 6A is a plan view illustrating an automatic transmission pattern displayed on a front side of the monitor according to the second embodiment, FIG. 6B is a plan view illustrating the automatic transmission pattern displayed on a rear side of the monitor, and FIG. 7 is a schematic side view illustrating a manipulation range of a shift lever according to the second embodiment.

As shown in FIG. 5, the transmission operating apparatus A according to this embodiment includes a brake sensor 21 which detects ON/OFF of a non-illustrated brake pedal, a position selecting switch 22 which selects positions of the whole automatic transmission positions displayed on the monitor 10 in the forward and backward direction, and a vehicle speed sensor 23.

Brake Sensor

When the driver depresses the non-illustrated brake pedal to a predetermined position, the brake sensor 21 transmits a signal to the counterforce control unit 4B in the controller 4. In this counterforce control unit 4B, when the shift lever 1 is positioned in the P position of the automatic transmission pattern while the vehicle is kept stopped, a greater counterforce is set so as to restrict the movement of the shift lever 1 from the P position to the R position. And when the signal is transmitted from the brake sensor 21 to the counterforce control unit 4B, the greater counterforce is changed to the normal counterforce.

Position Selecting Switch

As shown in FIGS. 6A and 6B, the position selecting switch 22 is provided at the proximity of the monitor 10. The position selecting switch 22 alternately switches the whole automatic transmission positions displayed on the monitor 10 between the front position and the rear position of the monitor 10. The position selecting switch 22 operates only when the shift lever 1 is positioned in a predetermined position (P position) while the vehicle is kept stopped. To be more specific, as shown in FIG. 5, the signal from the position selecting switch 22 is transmitted to the operation panel setting unit 4A. Based on the signals respectively transmitted from the forward/backward direction sensor 3 and the vehicle speed sensor 23, the operation panel setting unit 4A determines whether the shift lever 1 is positioned in the predetermined position when the vehicle is stopped. If the aforementioned condition is satisfied, the operation panel setting unit 4A switches the whole automatic transmission positions based on the signal from the position selecting switch 22. The signal indicating that the switching of the whole automatic transmission positions has been completed is then transmitted from the operation panel setting unit 4A to the monitor 10 and the counterforce control unit 4B. The counterforce control unit 4B then controls the forward/backward manipulation counterforce actuator 9 such that the admissible operation area assigned to the front position or the rear position of the whole automatic transmission positions is adjusted by the forward/backward manipulation counterforce actuator 9. As shown in FIGS. 6A and 6B, the position of the whole automatic transmission positions can be adjusted by the counterforce which is electrically applied by the forward/backward manipulation counterforce actuator 9 within the range where the shift lever 1 is mechanically movable, i.e., the mechanically or structurally defined range (mechanically movable range in the drawings). In other words, as shown in FIGS. 6A and 6B, the forward/backward manipulation counterforce actuator 9 electrically applies the counterforce such that the manipulation restricted area is defined within the mechanically movable range to thereby fix the admissible operation area assigned to the corresponding front or rear position of the whole automatic transmission positions.

According to this embodiment, since the whole automatic transmission positions are shifted along the forward and backward direction, the monitor 10 is constructed longer for two positions than the monitor 10 according to the first embodiment.

In the counterforce control unit 4B, based on the signal from the operation panel setting unit 4A indicating the operation panel selected by the position selecting switch 22, the manipulation range 24, 25 of the shift lever 1 can be adjusted in the forward and backward direction within the mechanically movable range 26 where the mechanical movement of the shift lever 1 is allowed as illustrated in FIG. 7. To be more specific, the counterforce control unit 4B sets a load based on the signal from the operation panel setting unit 4A such that a further movement of the shift lever 1 in the forward direction or the backward direction from the P position or the 2 position of the automatic transmission pattern is not allowed. Accordingly, the counterforce control unit 4B alternately switches the manipulation range of the shift lever 1, for example, between the front side manipulation range 24 and the rear side manipulation range 25. Further, based on the signal from the position selecting switch 22, the counterforce control unit 4B transmits a signal to the forward/backward manipulation counterforce actuator 9, so as to apply a counterforce for displacing the shift lever 1 in the P position of the front side manipulation range 24 or the rear side manipulation range 25. In this embodiment, the manipulation range of the shift lever 1 is exemplified as being switchable between the front side manipulation range 24 and the rear side manipulation range 25. However, the present invention is not limited to this particular embodiment, and the manipulation range of the shift lever 1 can be set arbitrarily.

The counterforce control unit 4B controls the operation load, based on the drive condition of the vehicle and the position of the shift lever 1, such that the movement of the shift lever 1 in a particular direction requires a greater operation load. To be more specific, based on the signal transmitted from the vehicle sensor 23 through the operation panel setting unit 4A and the signal transmitted from the forward/backward direction sensor 3, the counterforce control unit 4B sets an increased operation load, so that when the vehicle is in the normal drive condition, the shift lever 1 does not shift to the R position. Even if the driver manipulates the shift lever 1 against the increased operation load, the shift lever 1 is not shifted to the R position and is retained between the R position and the N position. During this operation, the transmission control unit 4C keeps on transmitting a signal that is based on the previous position of the shift lever 1 without consideration of the manipulation against the increased operation load to the transmission 6. Thereafter, when the driver releases the operation load from the shift lever 1, based on the signal from the forward/backward direction sensor 3, the counterforce control unit 4B recognizes that the shift lever 1 is being returned to the N position. The counterforce control unit 4B then changes the increased operation load to a predetermined detent load that allows the shift lever 1 to gradually return to the N position.

In the case in which the shift lever 1 is positioned in the P position when the vehicle is stopped, based on the signals from the forward/backward direction sensor 3 and the like, the counterforce control unit 4B sets an increased operation load so as to prevent the shift lever 1 from being shifted to the R position. As previously described, even if the driver manipulates the shift lever 1 against the increased operation load, the transmission control unit 4C keeps on transmitting the signal that is based on the previous position of the shift lever 1 without consideration of the manipulation against the increased operation load and that indicates the P position to the transmission 6. When the driver releases the operation load, the shift lever 1 gradually returns to the original position by the action of the detent load set by the counterforce control unit 4B. As discussed above, when the shift lever 1 is positioned in the P position, the increased operation load is changed to the normal operation load by the depression of the brake pedal.

Operation of the transmission operating apparatus A will be described with reference to FIGS. 6A and 6B.

When the driver starts the engine of the vehicle, the automatic transmission pattern is displayed on the monitor 10 at the front side of the monitor 10 as shown in FIG. 6A, and the shift lever 1 is positioned in the P position of the automatic transmission pattern. In this instance, since the counterforce control unit 4B sets the increased operation against the movement of the shift lever 1 between the P position and the R position, the shift lever 1 is in the so-called shift lock state and the driver can not move the shift lever 1 in the backward direction. When the driver depresses the brake pedal to disengage the shift lock, as is similar to the first embodiment, the detent loads are set for the respective positions in accordance with the position of the shift lever 1, that is, in the P position. Therefore, it is possible for the driver to move the shift lever 1 to a desired position.

If the driver wishes to move the position of the whole automatic transmission positions from the front side to the rear side of the monitor 10, the driver firstly positions the shift lever 1 in the P position when the vehicle is stopped and then depresses the position selecting switch 22. When the position selecting switch 22 is depressed under the certain condition, the operation panel setting unit 4A displaces the whole automatic transmission positions to the rear side of the monitor 10 (see FIG. 6B). Further, the counterforce control unit 4B displaces the manipulation range of the shift lever 1 from the front side manipulation range 24 to the rear side manipulation range 25 (see FIG. 7), and the shift lever 1 moves to the P position of the rear side manipulation range 25. Therefore, the shift lever 1 is positioned in the P position in relation to the whole automatic transmission positions displaced at the rear side of the monitor 10. The shift lever 1 thereby positioned in the P position of the rear side manipulation range 25 is still in the shift lock state, and the depression of the brake pedal allows the manipulation of the shift lever 1 in the manner same as described in the first embodiment. Also, if the driver wishes to move the position of the whole automatic transmission positions to the front side again, the driver positions the shift lever 1 in the P position when the vehicle is stopped, and thereafter depresses the position selecting switch 22. The position of the whole automatic transmission positions is then displaced to the front side of the monitor 10, and the manipulation range of the shift lever 1 is moved to the front side manipulation range 24.

In the case in which the vehicle travels with the shift lever 1 positioned in the D position, the counterforce control unit 4B sets the increased operation load between the R position and the N position such that the shift lever 1 does not shift in the R position. For this reason, even if the driver unintentionally moves the shift lever 1 toward the R position, the shift lever 1 is not shifted to the R position and is retained between the R position and the N position. During this operation, the transmission control unit 4C keeps on transmitting the signal indicating the N position that is the previous position of the shift lever 1. Thereafter, when the driver releases the shift lever 1, the shift lever 1 gradually returns to the original position, that is, to the N position by means of the forward/backward manipulation counterforce actuator 9 controlled by the counterforce control unit 4B.

The transmission operating apparatus A according to the second embodiment of the invention provides the following advantages.

(1) The front side or the rear side manipulation range 24, 25 of the shift lever 1 can be adjusted in the forward and backward directions within the mechanically movable range 26 of the shift lever 1 by means of the counterforce control unit 4B, and the position of the whole automatic transmission positions displayed on the monitor 10 can be adjusted in the forward and backward directions by means of the operation panel setting unit 4A. The forward/backward positions of the shift lever 1 can be adjustable without requiring a dedicated mechanism. Therefore, it is possible for the driver to select a desired shift lever position according to his body size or preference.

(2) In the case in which the shift lever 1 is positioned in the P position when the vehicle is stopped, the counterforce control unit 4B locks up the movement of the shift lever 1 until the driver depresses the brake pedal. Therefore, the shift lock can be achieved without requiring a dedicated mechanism.

(3) During the travel of the vehicle, the counterforce control unit 4B restricts the movement of the shift lever 1 to the R position. Therefore, the reverse lock can be achieved without requiring a dedicated mechanism.

Third Embodiment

Figure 9:
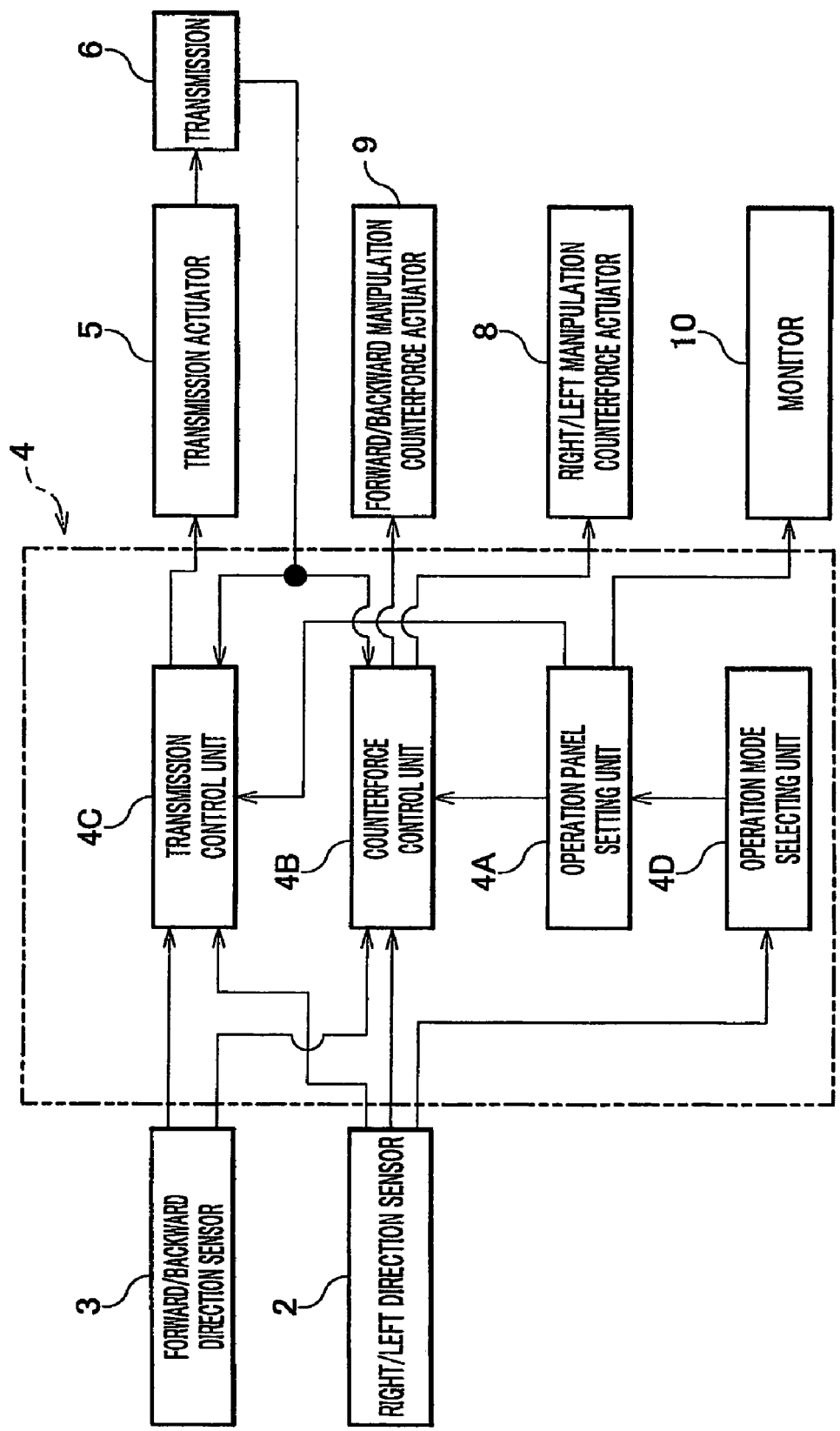
FIG. 9 is a block diagram illustrating the structure of the transmission operating apparatus shown in FIG. 8.
Figure 10:
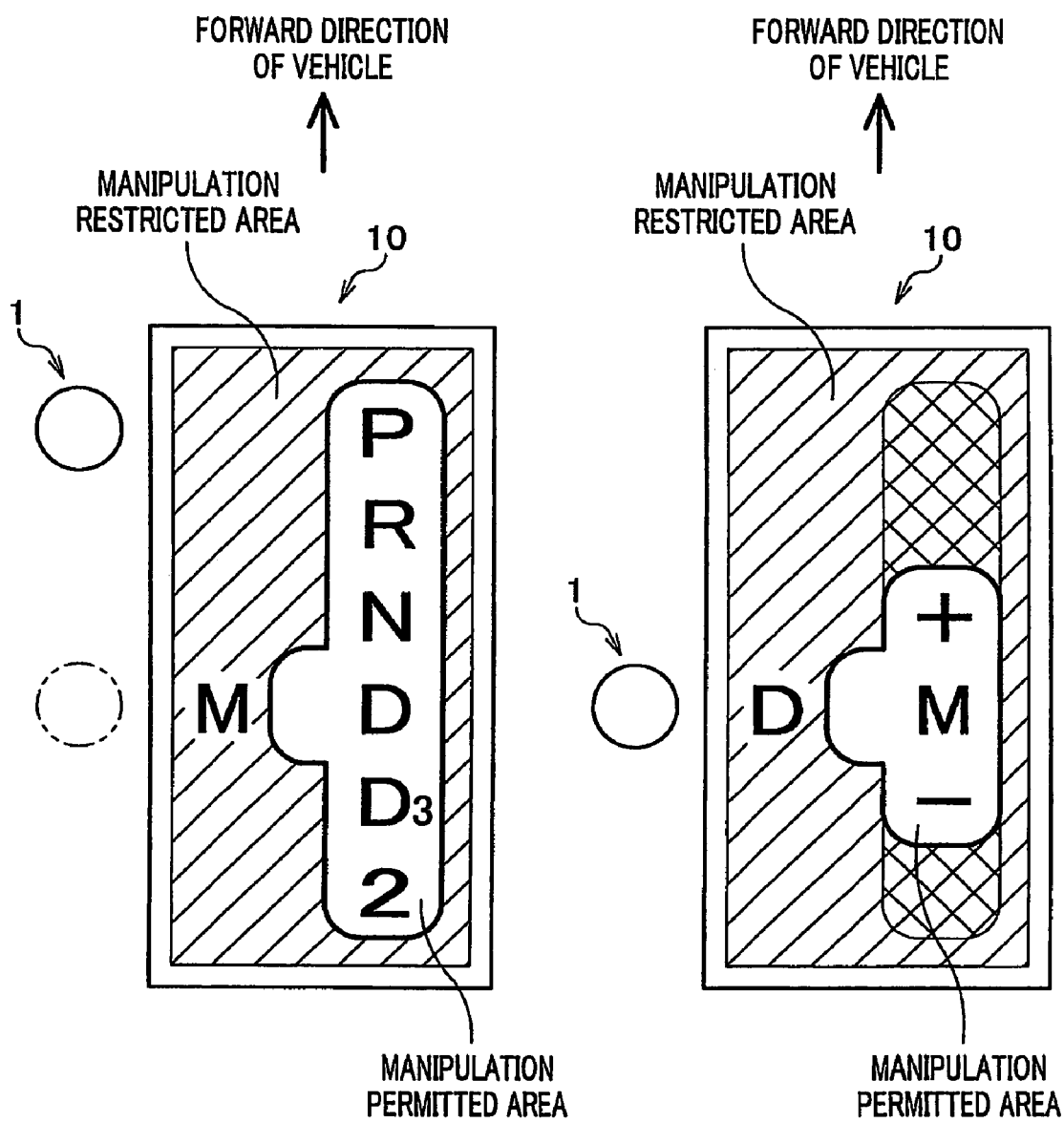
FIG. 10A is a plan view illustrating an automatic transmission pattern displayed on a monitor shown in FIG. 8.
FIG. 10B is a plan view illustrating a manual transmission pattern displayed on the monitor.

A transmission operating apparatus according to the third embodiment of the invention will be described below. Since the transmission operating apparatus described in this embodiment is a modification of the first embodiment, like reference characters designate corresponding parts in the drawings and detailed description thereof will be omitted. In the drawings to be referred herein, FIG. 8 shows the whole arrangement of the transmission operating apparatus according to the third embodiment of the invention, FIG. 9 is a block diagram illustrating the structure of the transmission operating apparatus shown in FIG. 8, FIG. 10A is a plan view illustrating an automatic transmission pattern displayed on a monitor shown in FIG. 8, and FIG. 10B is a plan view illustrating a manual transmission pattern displayed on the monitor.

Figure 8:
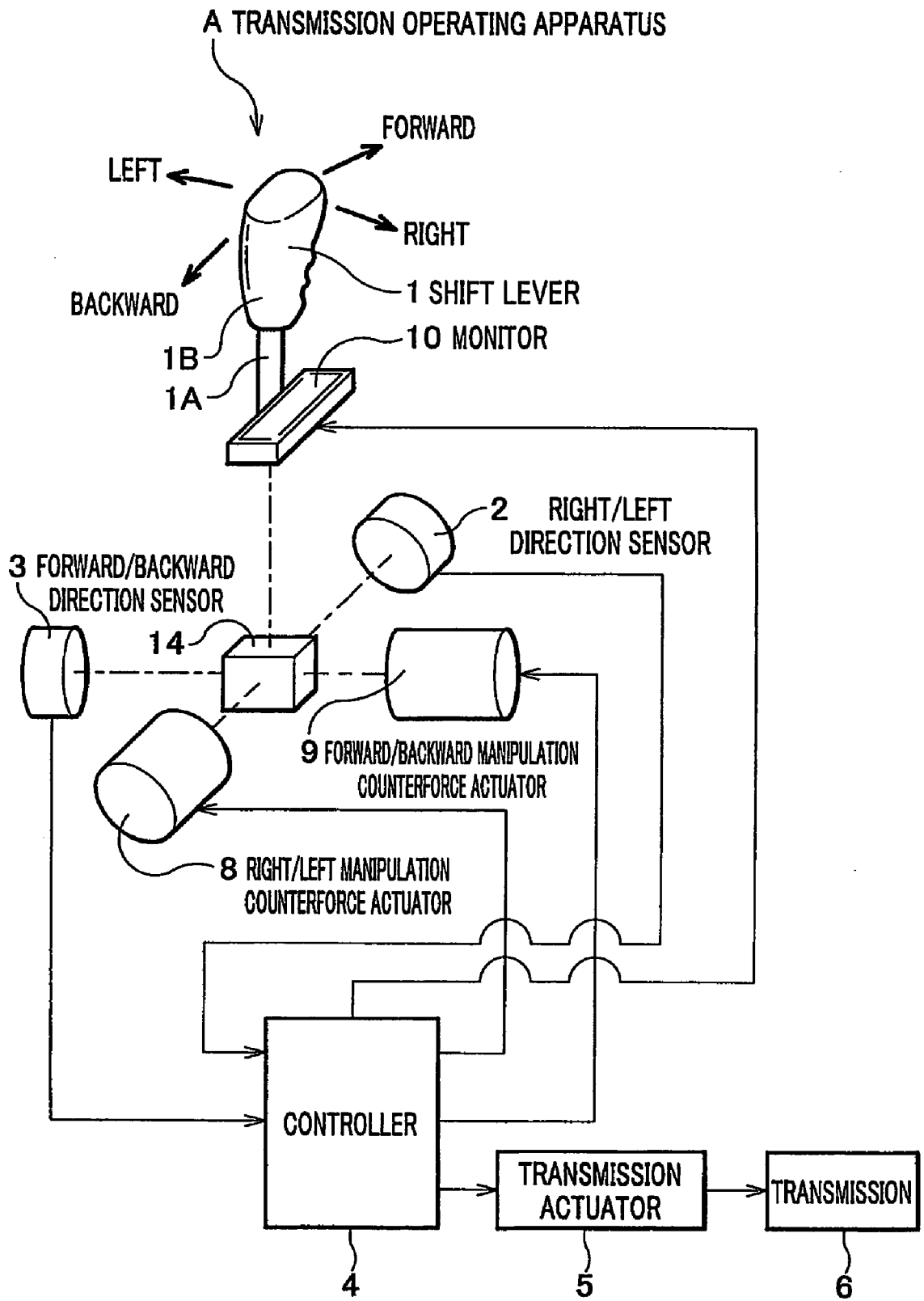
FIG. 8 shows the whole arrangement of a transmission operating apparatus according to a third embodiment of the invention.

As shown in FIG. 8, the transmission operating apparatus A according to this embodiment includes a support mechanism 14 which supports the shift lever 1 in a manner tiltable in right and left directions as well as in forward and backward directions. The tilting operation of the shift lever 1 in the right and left directions is detected by a right/left direction sensor 2, such as a potentiometer provided at the rotation shaft that enables the manipulation of the shift lever 1 in the right and left directions, so that the manipulation amount is detected (outputted) as an electric signal. The right/left direction sensor 2 transmits the detected value to the controller 4.

The support mechanism 14 has a right/left manipulation counterforce actuator 8, which applies a counterforce to the movement of the shift lever 1 in the right and left directions. Direction and magnitude of the counterforce is set by the controller, as will be described later.

In this embodiment, the right/left direction sensor 2 and the forward/backward direction sensor 3 correspond to the "position detector" defined in the claims. The counterforce control unit 4B of the controller 4, the right/left manipulation counterforce actuator 8, and the forward/backward manipulation counterforce actuator 9 correspond to the "counterforce applying unit" defined in the claims.

As shown in FIG. 9, the counterforce control unit 4B sets a counterforce on the basis of the signals from the forward/backward direction sensor 3 and the right/left direction sensor 2, and transmits the signal indicating the counterforce to the forward/backward manipulation counterforce actuator 9 and the right/left manipulation counterforce actuator 8, respectively. To be more specific, as shown in FIG. 10A, in the case in which the shift lever 1 is manipulated at the automatic transmission positions, the counterforce control unit 4B transmits a signal indicating a predetermined large counterforce to the right/left manipulation counterforce actuator 8 such that the shift lever 1 is always brought into contact with the right-side wall (not shown) of the shift gate formed in the support mechanism 14. Further, when the shift lever 1 is in the P position or the 2 position, the shift lever 1 is retained at the front end or the rear end of the shift gate so that the shift lever 1 does not move in the forward direction or the backward direction. In this embodiment, the right/left manipulation counterforce actuator 8 is employed to urge the shift lever 1 against the wall of the shift gate. However, the present invention is not limited to this construction, and a spring and the like may be employed to urge the shift lever 1 against the wall of the shift gate. Further, instead of the construction to retain the shift lever 1 at the front end and the rear end, for example, the shift lever 1 may be retained by the counterforce applied from the forward/backward manipulation counterforce actuator 9.

As shown in FIG. 10B, in the case in which the shift lever 1 is positioned in the manual transmission position other than the M position, the counterforce control unit 4B transmits a signal to the forward/backward manipulation counterforce actuator 9 and the right/left manipulation counterforce actuator 8, respectively, such that the shift lever 1 moves only in the direction toward the M position. When the shift lever 1 is positioned in the M position, the counterforce control unit 4B transmits a signal to the forward/backward manipulation counterforce actuator 9 and the right/left manipulation counterforce actuator 8, respectively, such that the shift lever 1 does not move only in the rightward direction.

The void area surrounded by diagonal lines as shown in FIG. 10A indicates the shape of the shift gate (mechanically movable range), and the hatching area illustrated by double diagonal lines (grid lines) as shown in FIG. 10B indicates the manipulation restricted area where the forward/backward manipulation counterforce actuator 9 electrically restricts the movement of the shift lever 1 within the mechanically movable range. Since the counterforce control unit 4B controls the forward/backward manipulation counterforce actuator 9, it is possible to switch the transmission pattern within the same shift gate between the automatic transmission pattern and the manual transmission pattern. In the manner same as described in the first embodiment, because of the mechanism for locking up the shift lever when the engine is stopped, the shift lever 1 is locked up in the P position of the automatic transmission pattern.

According to this embodiment, the operation mode selecting switch 7 is not provided at the monitor 10. In stead, the operation mode selecting switch according to this embodiment is achieved by a sideward shifting movement of the shift lever 1. The controller 4 includes an operation mode selecting unit 4D, to which a signal from the right/left direction sensor 2 is transmitted when the driver shifts the shift lever 1 to the sideward direction.

Specifically, when the driver applies a load and moves the shift lever 1 sideward from the D position of the automatic transmission pattern to the M side for a predetermined amount, the operation mode selecting unit 4D transmits a signal to the operation panel setting unit 4A. And by means of the operation panel setting unit 4A, the manual transmission pattern is displayed on the monitor 10. Further, when the driver applies a load and moves the shift lever 1 sideward from the M position of the manual transmission pattern to the D side for a predetermined amount, the operation mode selecting unit 4D transmits a signal to the operation panel setting unit 4A. And by means of the operation panel setting unit 4A, the automatic transmission pattern is displayed on the monitor 10.

The transmission operating apparatus A according to the third embodiment of the invention provides the following advantages.

(1) The automatic transmission pattern and the manual transmission pattern can be switched within the same shift gate. Unlike the conventional transmission operating apparatus, it is not necessary to provide the shift gates of the automatic transmission pattern and the manual transmission pattern adjacently to each other, which leads to decreased space requirement in the right and left direction.

(10) At the certain position of the shift lever 1, applying a load to the shift lever 1 in the sideward direction functions to switch between the automatic transmission operation mode and the manual transmission operation mode. Therefore, not like the first embodiment, it is not necessary to provide the external and separate operation mode selecting switch 7, which leads to reduction of the cost. In this embodiment, switching between the automatic transmission operation mode and the manual transmission operation mode is achieved when the driver applies a load and moves the shift lever 1 in the sideward direction for a predetermined amount. However, the present invention is not limited to this particular construction, and, for example, a pressure switch may be provided on the side where a load is applied to the shift lever 1. In this instance, unlike this embodiment, it is not necessary to shift the shift lever 1 for the predetermined amount. For example, at the D position or the M position, if the driver applies a load to the shift lever 1 in the sideward direction, the pressure switch is turned on. Therefore, it is possible to reduce the space requirement in the right and left direction, which leads to decreased size of the transmission operating apparatus.

Fourth Embodiment

A transmission operating apparatus according to the fourth embodiment of the invention will be described below. Since the transmission operating apparatus described in this embodiment is a modification of the first embodiment and the third embodiment, like reference characters designate corresponding parts in the drawings and detailed description thereof will be omitted. In the drawings to be referred herein, FIG. 11 is an enlarged perspective view illustrating a shift lever and a monitor of the transmission operating apparatus according to the fourth embodiment of the invention, FIG. 12A is a plan view illustrating an automatic transmission pattern displayed on a monitor according to the forth embodiment, FIG. 12B is a plan view illustrating a manual transmission pattern displayed on the monitor, and FIG. 13 is a block diagram illustrating the structure of the transmission operating apparatus according to the fourth embodiment.

Figure 11:
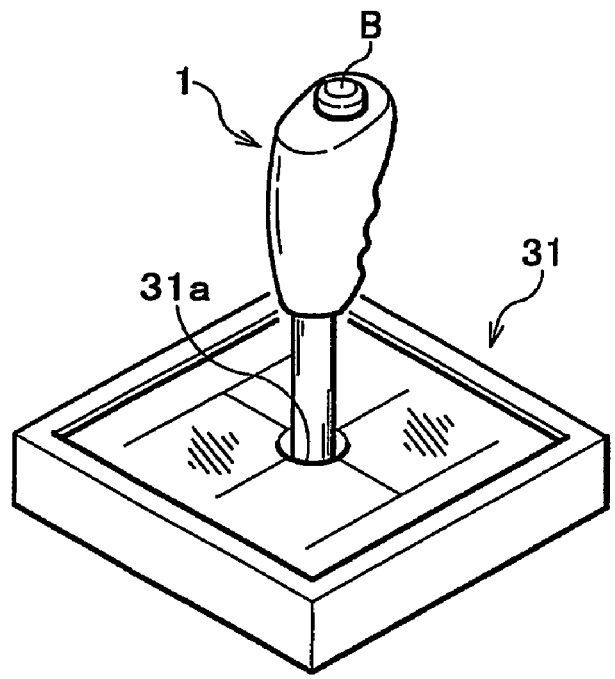
FIG. 11 is an enlarged perspective view illustrating a shift lever and a monitor of a transmission operating apparatus according to a fourth embodiment of the invention.

As shown in FIG. 11, the transmission operating apparatus A according to this embodiment is equipped with a hole 31a at the center of the monitor 31, through which the shift lever 1 is inserted. The monitor 31 is constructed to be movable in the same direction as the manipulation of the shift lever 1, and the relative position between the shift lever 1 and the monitor 31 is kept constant. In this embodiment, a button B provided at the top surface of the shift lever 1 functions as the operation mode selecting switch 7. By depressing the button B under a certain condition switches the automatic transmission operation mode and the manual transmission operation mode alternately.

Figure 12A:
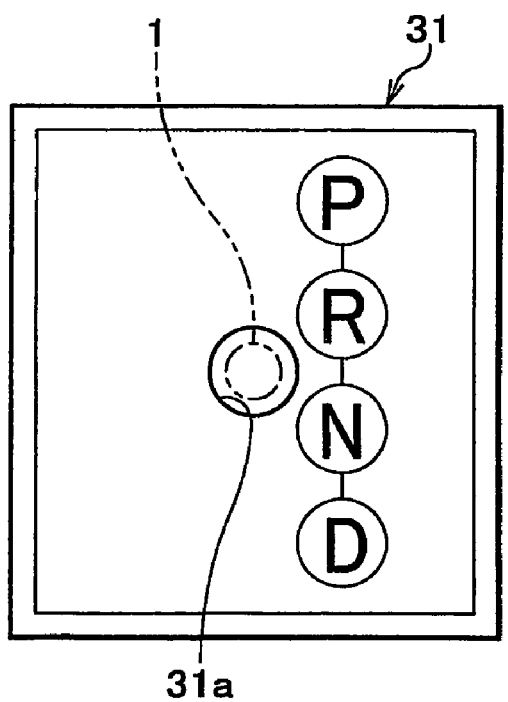
FIG. 12A is a plan view illustrating an automatic transmission pattern displayed on a monitor according to the forth embodiment.
Figure 12B:
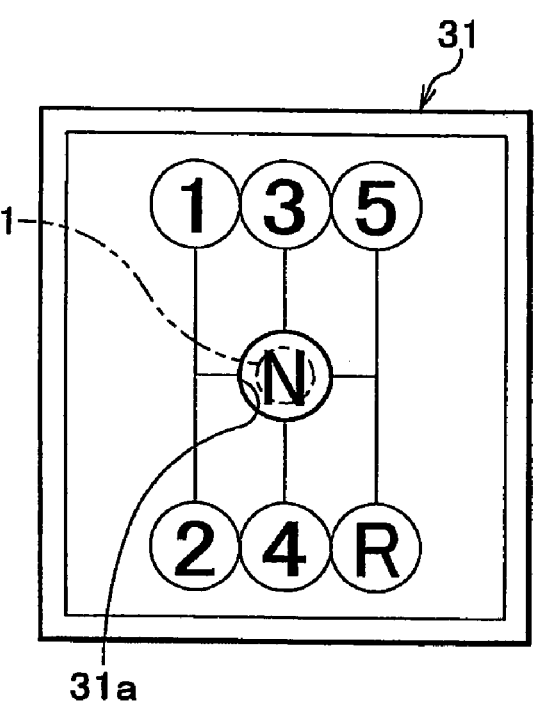
FIG. 12B is a plan view illustrating a manual transmission pattern displayed on the monitor.
Figure 13:
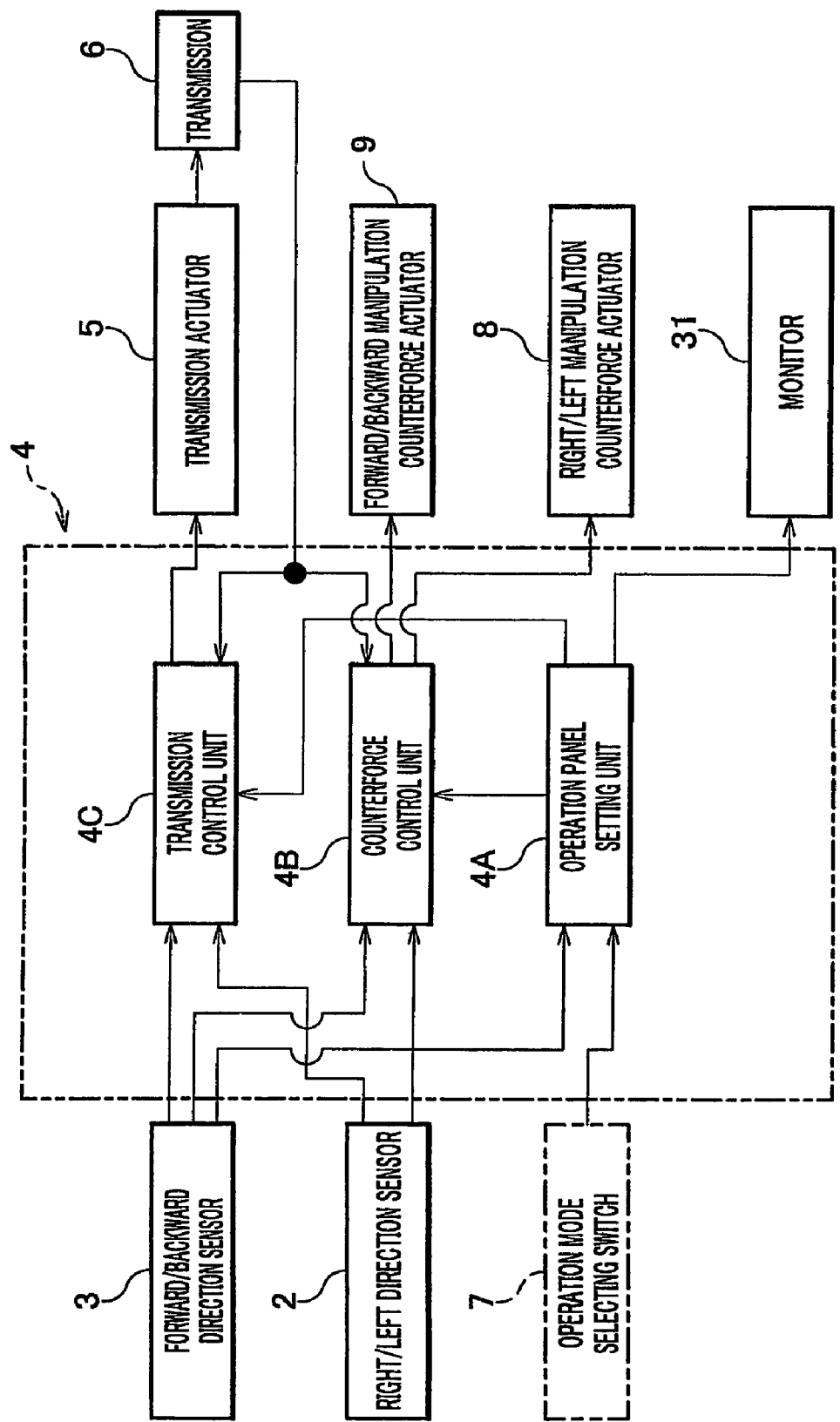
FIG. 13 is a block diagram illustrating the structure of a transmission operating apparatus according to the fourth embodiment.

As shown in FIG. 12A, the operation panel displayed on the monitor 31 sets two patterns: the automatic transmission pattern in the shape of an "I" wherein the automatic transmission positions, such as the P (parking), the R (reverse), the N (neutral), and the D (drive) are arranged in line along the forward and backward direction in turn from the forward; and the manual transmission pattern wherein the first to fourth speed gears, and the third to fifth speed gears and the R gear are respectively arranged in the shape of an "H". The operation panel setting unit 4A appropriately controls the transmission patterns displayed on the monitor 31 so as to be shifted in the direction opposite to the movement of the monitor 31, whereas the relative position between the monitor 31 and the shift lever 1 is kept constant.

As to the condition required for switching the transmission pattern by means of the operation mode selecting switch 7, the shift lever 1 must be positioned either in the P position or the N position in the case of the automatic transmission pattern, and the shift lever 1 must be positioned in the N position in the case of the manual transmission pattern. To be more specific, as shown in FIG. 13, the operation panel setting unit 4A determines, based on the signal from the forward/backward direction sensor 3, the position of the shift lever 1 corresponding to the current operation panel. And only when the shift lever 1 is positioned in the previously described position, the operation panel setting unit 4A refers the signal from the operation mode selecting switch 7 so as to switch the operation panel.

According to this embodiment, in the case in which the driver stops the engine with the automatic transmission pattern displayed on the monitor 31, the non-illustrated lock-up mechanism locks up the shift lever 1 in the P position with the shift lever 1 tilted forward from the upright position (herein-after referred to as a "neutral position") and with the monitor 31 displaced forward from the neutral position. When the driver starts the engine, the lock-up mechanism disengages the shift lock state of the shift lever 1. Thereafter, based on the signal from the operation panel setting unit 4A and the signals from the forward/backward direction sensor 3 and the right/left direction sensor 2, the counterforce setting unit 4B recognizes that the shift lever 1 is positioned in the P position, and transmits the signal to the forward/backward manipulation counterforce actuator 9 and the right/left manipulation counterforce actuator 8 such that a predetermined counterforce is applied to the shift lever 1 to retain the shift lever 1 in the P position.

Meanwhile, in the case in which the driver stops the engine with the manual transmission pattern displayed on the monitor 31, as shown in FIG. 12B, the lock-up mechanism locks up the shift lever 1 in the N position of the manual transmission pattern where the shift lever 1 is in the neutral position. After the driver starts the engine, the lock-up mechanism disengages the shift lock state of the shift lever 1 in the manner same as described above, and the forward/backward manipulation counterforce actuator 9 and the right/left manipulation counterforce actuator 8 retains the shift lever 1 in the N position.

It is not necessary to lock up the shift lever 1 in the P position of the automatic transmission pattern or in the N position of the manual transmission pattern when the engine is stopped. For example, with such a construction that the shift lever 1 is always urged to the neutral position by a spring and the like, the shift lever 1 may always be retained in the neutral position when the engine is stopped. In this instance, for example, if the driver stops the engine with the automatic transmission pattern displayed on the operation panel, the shift lever 1 may return to the neutral position, and thereafter, if the driver starts the engine, the forward/backward manipulation counterforce actuator 9 and the right/left manipulation counterforce actuator 8 may return the shift lever 1 to the P position. Also, if the driver stops the engine with the manual transmission pattern displayed on the operation panel, the shift lever 1 may be retained in the neutral position that is the N position, and even if the driver starts the engine, the shift lever 1 may be retained in the N position.

When the automatic transmission pattern is switched from the automatic transmission pattern to the manual transmission pattern, the shift lever 1 positioned in the P position or the N position of the automatic transmission pattern is shifted to the N position of the manual transmission pattern. In other words, when the signal for switching the transmission pattern from the automatic transmission pattern to the manual transmission pattern is transmitted from the operation panel setting unit 4A to the counterforce control unit 4B, the counterforce control unit 4B transmits the signal to the forward/backward manipulation counterforce actuator 9 such that a counterforce is applied to displace the shift lever 1 in a certain direction for a certain amount in accordance with the signal from the operation panel setting unit 4A. Similarly, when the manual transmission pattern is switched to the automatic transmission pattern, the counterforce control unit 4B and the forward/backward manipulation counterforce actuator 9 move the shift lever 1 in a certain direction for a certain amount, so that the shift lever 1 positioned in the N position of the manual transmission pattern is shifted to the P position of the automatic transmission pattern In other words, when the signal for switching the transmission pattern from the manual transmission pattern to the automatic transmission pattern is transmitted from the operation panel setting unit 4A to the counterforce control unit 4B, the counterforce setting unit 4B transmits the signal to the forward/backward manipulation counterforce actuator 9 such that a counterforce is applied to displace the shift lever 1 in a certain direction for a certain amount in accordance with the signal from the operation panel setting unit 4A.

Operation of the transmission operating apparatus A according to this embodiment will be described with reference to FIG. 12.

In the case in which the automatic transmission pattern is set in the operation panel setting unit 4A as an initial value, when the driver starts the engine, the automatic transmission pattern as illustrated in FIG. 12A is displayed on the monitor 31. In this instance, although the lock-up mechanism disengages the shift lever 1 from the shift lock state in the P position, the counterforce control unit 4B instantly retains the shift lever 1 in the P position. For example, if the driver shifts the shift lever 1 in the D position, the monitor 31 displaces backward together with the shift lever 1, whereas the automatic transmission pattern displayed on the monitor 31 displaces forward for the distance substantially the same as the monitor 31 displaces. Accordingly, the driver feels as if the transmission pattern is stationary. As previously described, when the shift lever 1 is positioned in the D position, the counterforce control unit 4B sets the detent load between the respective positions, which allows the driver to carry out the automatic transmission operation in the conventional manner.

When switching the transmission pattern from the automatic transmission pattern to the manual transmission pattern, the driver positions the shift lever 1 either in the P position or the N position of the automatic transmission pattern and thereafter depresses the button B of the shift lever 1. At the depression of the button B under the certain condition, the operation panel setting unit 4A switches the automatic transmission pattern to the manual transmission pattern shown in FIG. 12B. And the counterforce control unit 4B displaces the shift lever 1 to the neutral position. When the shift lever 1 is positioned in the N position of the automatic transmission pattern that is displayed on the monitor 31, the counterforce control unit 4B appropriately sets the operation loads corresponding to the manual transmission pattern arranged in the shape of an "H", which allows the driver to carry out the H type manual transmission operation in the conventional manner.

In the case in which the manual transmission pattern is set in the operation panel setting unit 4A as an initial value, when the driver starts the engine, the manual transmission pattern as illustrated in FIG. 12B is displayed on the monitor 31. In this instance, the shift lock state of the sift lever 1 is disengaged in the same manner as described above, and thereafter, the counterforce control unit 4B instantly retains the shift lever 1 in the N position of the manual transmission pattern that is displayed on the monitor 31.

When switching the transmission pattern from the manual transmission pattern to the automatic transmission pattern, the driver positions the shift lever 1 in the N position of the manual transmission pattern and thereafter depresses the button B of the shift lever 1. At the depression of the button B under the certain condition, the operation panel setting unit 4A switches the manual transmission pattern to the automatic transmission pattern shown in FIG. 12A. And the counterforce control unit 4B and the forward/backward manipulation counterforce actuator 9 displace the shift lever 1 to the P position of the automatic transmission pattern. When the shift lever 1 is positioned in the P position, the counterforce control unit 4B likewise sets the detent load between the respective positions, which allows the driver to carry out the automatic transmission operation in the conventional manner.

The transmission operating apparatus A according to the fourth embodiment of the invention provides the following advantages.

(1) The automatic transmission pattern is an I type arrangement where the shift lever 1 is manipulated mainly in the forward and backward directions, whereas the manual transmission pattern is an H type arrangement where the shift lever 1 is manipulated in the right and left directions as well as in the forward and backward directions. Therefore, the driver can recognize the automatic transmission pattern and the manual transmission pattern without confusion.

(2) If this embodiment is achieved by means of a mechanical shift gate construction, the automatic transmission apparatus will be complicated. However, according to this embodiment, a shift gate (transmission pattern) is readily prepared merely by setting the controller 4 (computer) in terms of the counterforce, etc, which leads to a simple structure of the transmission operating apparatus.

While the invention has been described in detail with reference to specific embodiments thereof, it will be apparent to one skilled in the art that various changes and modifications may be made without departing from the scope of the claims.

(i) In the first embodiment, the shift lock is performed when the uppermost gear or the lowermost gear of the manual transmission pattern is selected. However, the present invention is not limited to this construction. For example, the movement of the shift lever 1 may be restricted at a point where the manipulation of the shift lever 1 in the downshift direction causes the engine to be driven at over-speed, by way of applying an increased operation load in the downshift direction. In this instance, the transmission operating apparatus according to the first embodiment may be provided with a separate engine speed sensor and the like, so as to control the counterforce control unit based on the signal from the engine speed sensor.

(ii) In the fourth embodiment, the automatic transmission pattern is arranged in the shape of an "I". However, the present invention is not limited to this specific arrangement, and any pattern may be employed as long as being distinguishable from the H type manual transmission pattern. For example, the automatic transmission pattern may be arranged in a zigzag manner.

(iii) In the second embodiment, the monitor 10 merely displays the automatic transmission pattern. However, the present invention is not limited to this specific embodiment. As in the case of the first embodiment, the automatic transmission pattern and the manual transmission pattern may be switchable.

(iv) Instead of the construction of the first embodiment wherein the automatic transmission pattern and the manual transmission pattern can be switchable and wherein the counterforce control unit 4B sets a counterforce corresponding to the position of the shift lever 1 in accordance with the operation panel, the transmission operating apparatus may only employ the automatic transmission pattern, as a so-called automatic transmission type. In this instance, since the manual transmission pattern is not required, the monitor 10 may be replaced with a mechanical panel, which leads to reduction of the cost. Even with this construction, the detent load is appropriately set by the counterforce control unit in addition to the mechanical counterforce to be applied by the detent mechanism such as in the case of the conventional shift lever. Therefore, it is possible to prevent overshifting of the shift lever 1, to increase the operation load of the shift lever 1 upon shift-up or shift-down with the shift stage being set in the uppermost gear or the lowermost gear, to prevent the shift lever 1 from being shifted to the R position while the vehicle is running with the shift lever being positioned in the D position, and to achieve the shift lock without requiring a dedicated mechanism, so as to warn the driver of a wrong operation. Further, instead of the construction of the first embodiment, the transmission operating apparatus may only employ the manual transmission pattern, as a so-called manual transmission type. Also in this instance, since the automatic transmission pattern is not required, the monitor 10 may be replaced with a mechanical panel, which leads to reduction of the cost. Even with this construction, the detent load is appropriately set by the counterforce control unit in addition to the mechanical counterforce to be applied by the detent mechanism such as in the case of the conventional shift lever. Therefore, the counterforce control unit or the like warns the driver when the shift lever 1 is further shifted to the upshift or downshift direction from the uppermost gear or the lowermost gear.

(v) According to the first to fourth embodiments, the monitor 10, 31 is provided at the proximity of the base portion of the shift lever 1. However, the present invention is not limited to this construction. For example, at a front position of the driver seat where the speed meter, etc. are arranged, a display device may be provided so as to switch the transmission pattern between the automatic transmission pattern and the manual transmission pattern.

What is claimed is:

1. A transmission operating apparatus for a vehicle comprising:
   a shift lever manipulable by a driver; and
   at least one counterforce applying unit which electrically applies a counterforce counteracting a shifting operation of the shift lever to the shift lever corresponding to a respective position of the shift lever, wherein the counterforce to be applied to the shift lever by the counterforce applying unit is changed when predetermined conditions are satisfied.

2. A transmission operating apparatus according to claim 1, wherein when the shift stage is set in an uppermost gear or a lowermost gear, the counterforce applying unit increases the counterforce such that the shift lever is blocked against a respective further manual operation in the upshift or downshift direction.

3. A transmission operating apparatus according to claim 1, wherein when the vehicle runs at a predetermined vehicle speed or a higher vehicle speed, the counterforce applying unit increases the counterforce such that the shift lever is blocked against a manual operation to an R position.

4. A transmission operating apparatus according to claim 1, further comprising: at least one position detector which detects the respective position of the shift lever; and
   a transmission control unit which controls a transmission based on the position of the shift lever.

5. A transmission operating apparatus according to claim 4, further comprising a position selecting switch which selects one of a plurality of admissible operation areas in each of which the shift lever is movable, and an operation area adjusting unit which fixes, within a range in which the shift lever is mechanically movable, the respective admissible operation areas to be selected by the position selecting switch by means of the counterforce applying unit.

6. A transmission operating apparatus according to claim 4, wherein the counterforce applying unit applies a higher force to the shift lever when the shift lever is moved to a position that is two or more transmission positions away from a current transmission position in order to prevent a driver's unintentional shift lever manipulation.

7. A transmission operating apparatus according to claim 4, wherein the counterforce applying unit controls the counterforce such that the shift lever gradually returns to an original position when a manual shift operation force applied to the shift lever decreases.

8. A transmission operating apparatus according to claim 4, further comprising a manually manipulable operation mode selecting switch which selects one of a plurality of operation modes, and an operation area adjusting unit for different admissible operation areas assigned to the operation modes in each of which the shift lever is movable, which, depending on the selected operation mode, fixes the respective admissible operation area by means of the counterforce applying unit.

9. A transmission operating apparatus according to claim 8, wherein the plurality of operation modes comprise: an automatic transmission operation mode in which a plurality of automatic transmission positions are arranged having the form of an "I" or in a zigzag manner and one of the automatic transmission positions is selectable by the shift lever; and a manual transmission operation mode in which a plurality of shift transmission positions are arranged in the form of an "H" and one of the shift transmission positions is selectable by the shift lever.

10. A transmission operating apparatus according to claim 8, further comprising a display member for visually displaying the admissible operation area adjusted by the operation area adjusting unit.

11. A transmission operating apparatus according to claim 8, wherein the plurality of operation modes comprise: an automatic transmission operation mode in which a plurality of automatic transmission positions are arranged in line along a forward and backward direction and one of the automatic transmission positions can be selected by the shift lever; and a manual transmission operation mode in which shift stages are switchable by moving the shift lever along the forward and backward direction.

12. A transmission operating apparatus according to claim 11, wherein the operation mode selecting switch is configured such that applying a force to the shift lever in a sideward direction causes the selection between the automatic transmission operation mode and the manual transmission operation mode.

13. A transmission operating apparatus according to claim 11, wherein when the manual transmission operation mode is selected by the operation mode selecting switch and the shift stage is set in an uppermost gear or a lowermost gear, the counterforce applying unit controls the counterforce such that the shift lever is blocked against a respective further manual operation in the upshift or downshift direction.

14. A transmission operating apparatus according to claim 13, wherein in the manual transmission operation mode, the counterforce applying unit applies a predetermined counterforce by which the shift lever is gradually returned to a base position when the shift lever is moved from the base position in the forward or backward direction, and wherein the counterforce applying unit applies a counterforce that is greater than the predetermined counterforce to the shift lever when the shift lever is further shifted to the upshift or downshift direction from the uppermost gear or the lowermost gear.

* * * * *